US008815345B2

(12) United States Patent
Varanka et al.

(10) Patent No.: US 8,815,345 B2
(45) Date of Patent: Aug. 26, 2014

(54) METHOD FOR FABRICATING THREE DIMENSIONAL MODELS

(75) Inventors: Michael Varanka, Amherst, NH (US); John Wigand, Merrimack, NH (US)

(73) Assignee: Solidscape, Inc., Merrimack, NH (US)

( * ) Notice: Subject to any disclaimer, the term of this patent is extended or adjusted under 35 U.S.C. 154(b) by 59 days.

(21) Appl. No.: 13/481,281

(22) Filed: May 25, 2012

(65) Prior Publication Data
US 2013/0011562 A1 Jan. 10, 2013

Related U.S. Application Data

(60) Provisional application No. 61/490,247, filed on May 26, 2011.

(51) Int. Cl.
*B05D 3/12* (2006.01)
*B05D 3/00* (2006.01)
*B05D 5/00* (2006.01)

(52) U.S. Cl.
USPC .......................................... 427/289; 427/271

(58) Field of Classification Search
CPC .... B29C 67/0059; B29C 67/0092; C25D 1/003; C23C 18/1651
USPC ................................................. 427/289, 271
See application file for complete search history.

(56) References Cited

U.S. PATENT DOCUMENTS

| 4,247,508 | A | 1/1981 | Housholder |
| 5,136,515 | A | 8/1992 | Helinski |
| 5,209,878 | A | 5/1993 | Smalley et al. |
| 5,260,009 | A | 11/1993 | Penn |
| 5,506,607 | A | 4/1996 | Sanders, Jr. et al. |
| 5,740,051 | A | 4/1998 | Sanders, Jr. et al. |
| 6,019,814 | A | 2/2000 | Horine |
| 6,175,422 | B1 | 1/2001 | Penn et al. |
| 7,003,864 | B2 | 2/2006 | Dirscherl |
| 2002/0129485 | A1 | 9/2002 | Mok et al. |
| 2004/0089980 | A1 | 5/2004 | Owada |
| 2005/0087897 | A1 | 4/2005 | Nielsen et al. |
| 2009/0252821 | A1 | 10/2009 | Wigand et al. |
| 2010/0021638 | A1* | 1/2010 | Varanka et al. ............... 427/271 |
| 2011/0132767 | A1* | 6/2011 | Wu et al. ....................... 205/118 |

OTHER PUBLICATIONS

Osterberg et al. "Membuilder":An automated 3D solid model construction program for microelectromechanical structures, Transducers, 1995, p. 21-24.*

* cited by examiner

*Primary Examiner* — Kelly M Gambetta
(74) *Attorney, Agent, or Firm* — Davis & Bujold, PLLC; Michael J. Bujold

(57) ABSTRACT

A method of fabricating a three dimensional model from a composite model formed by a plurality of layers. The composite model comprises at least one shell material encasing and enclosing a build material. The method comprises the steps of (1) depositing a build layer of the build material onto a preceding layer, (2) removing a selected area of the build material from the deposited build layer; (3) depositing the shell material in any removed selected area of the build material; and (4) reducing the build layer to a desired final thickness for supporting a next build layer. Then repeatedly repeating steps (1) through (4) for each build layer until the composite model is completed. Finally, the undesired extraneous material, and possibly the shell, are removed to obtain the final model.

20 Claims, 25 Drawing Sheets

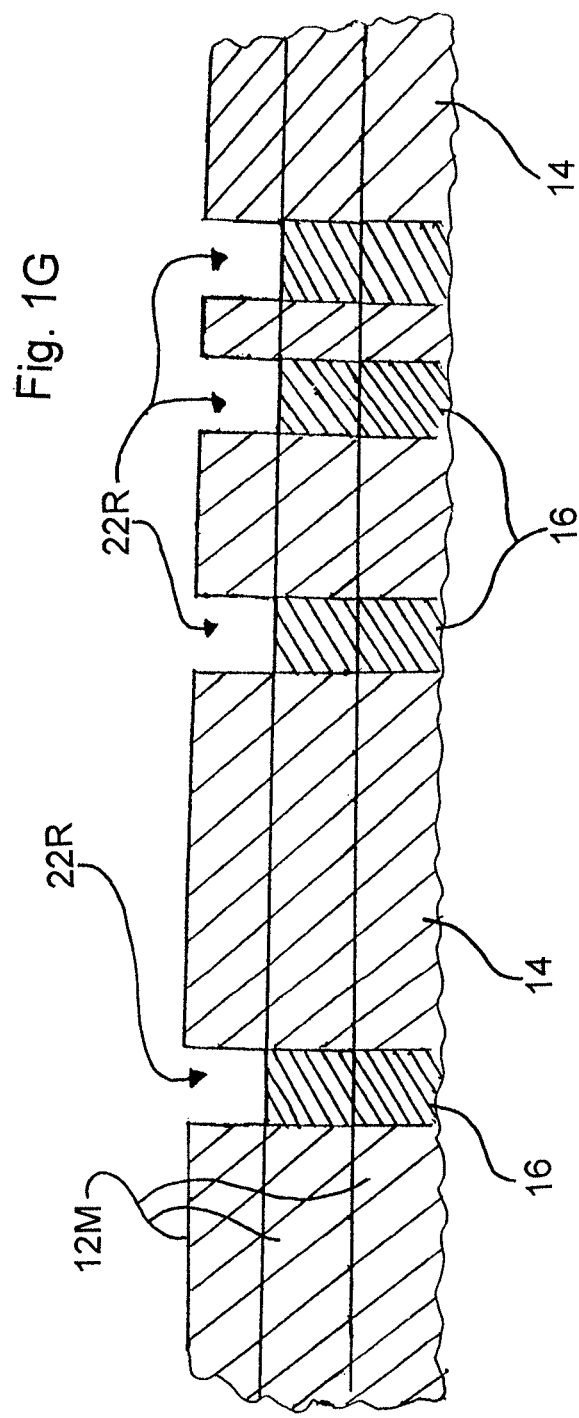

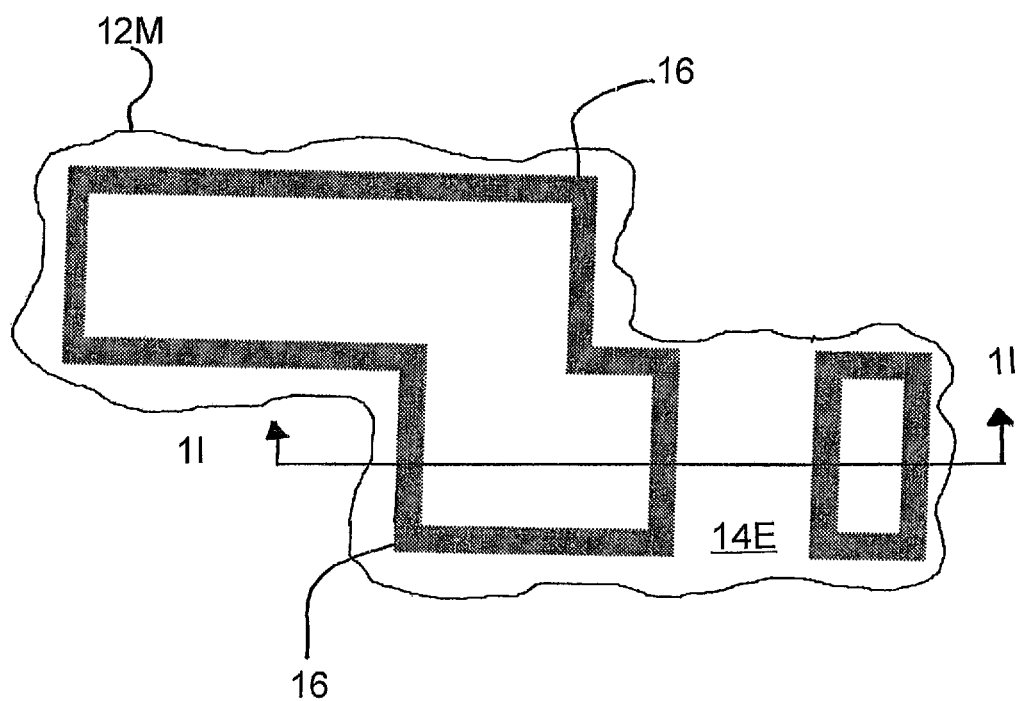

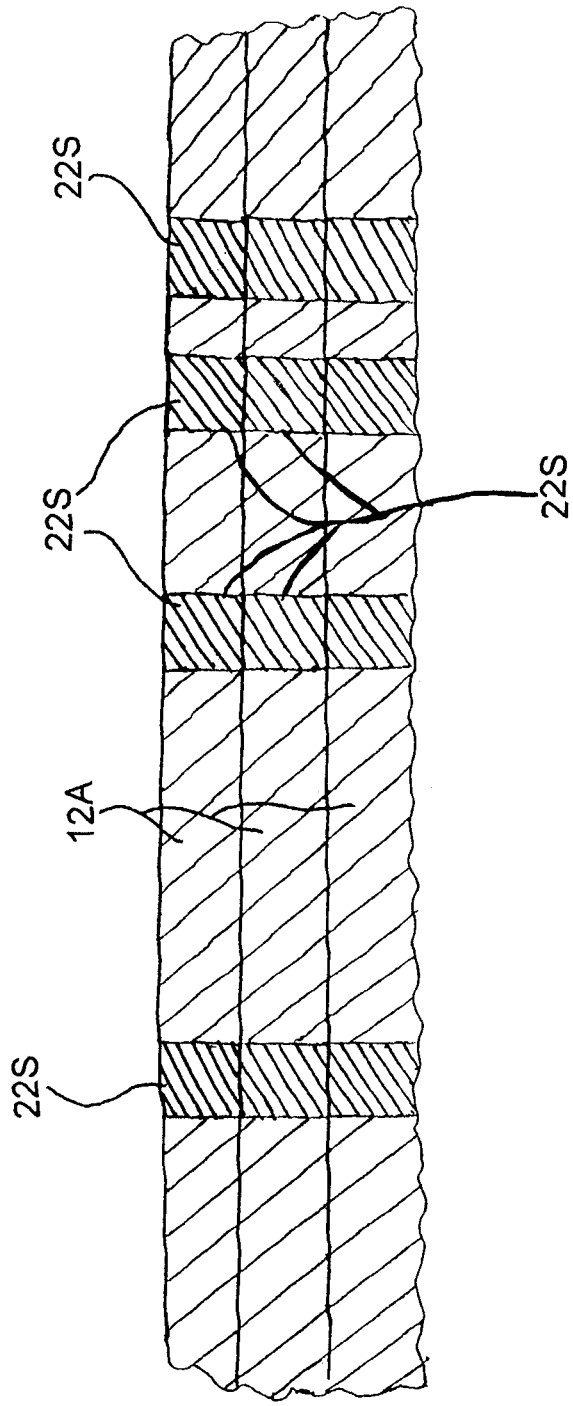

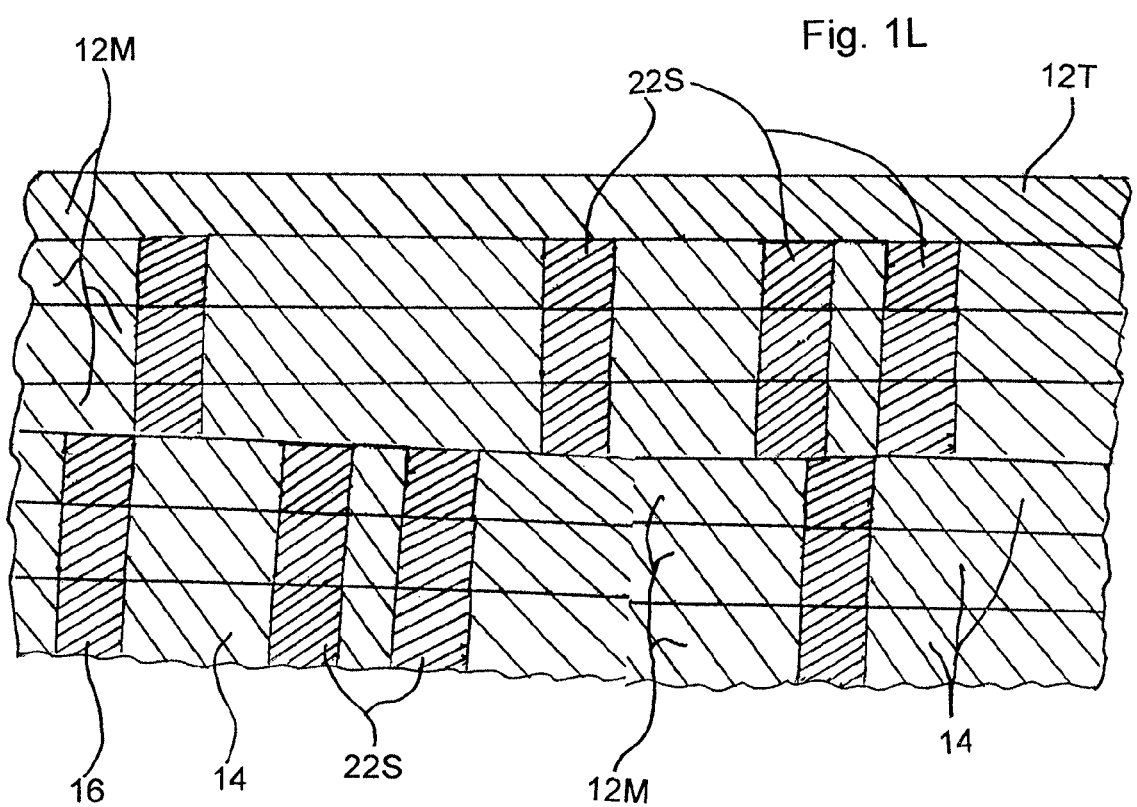

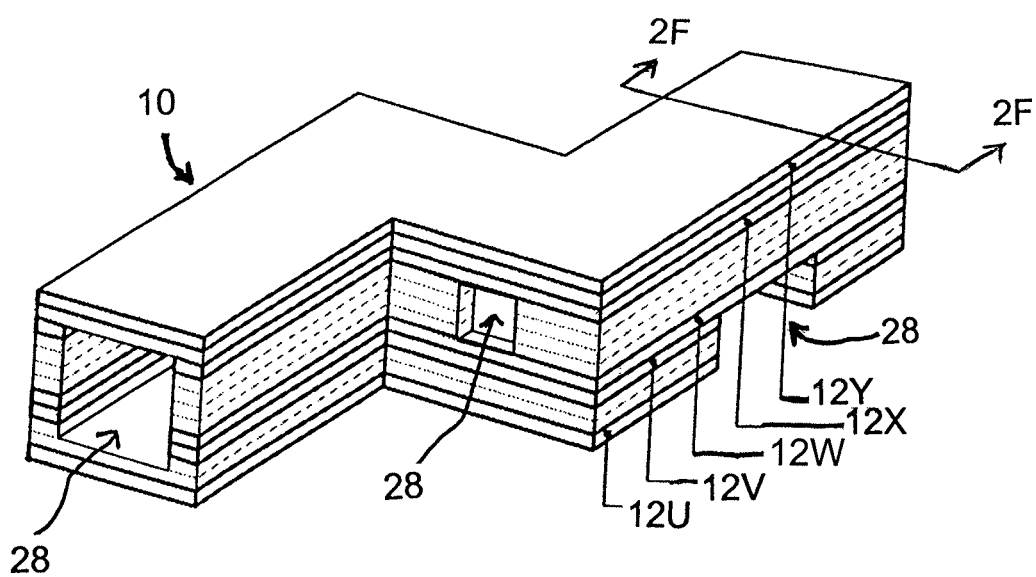

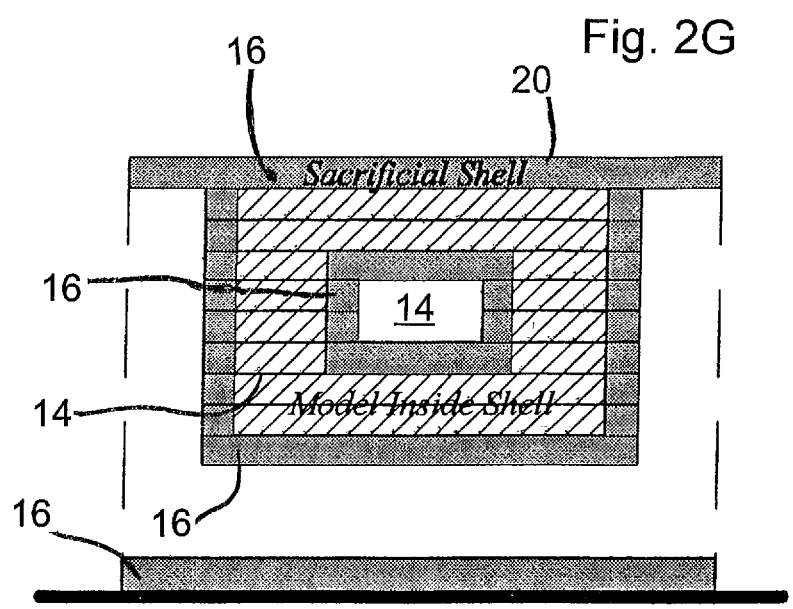

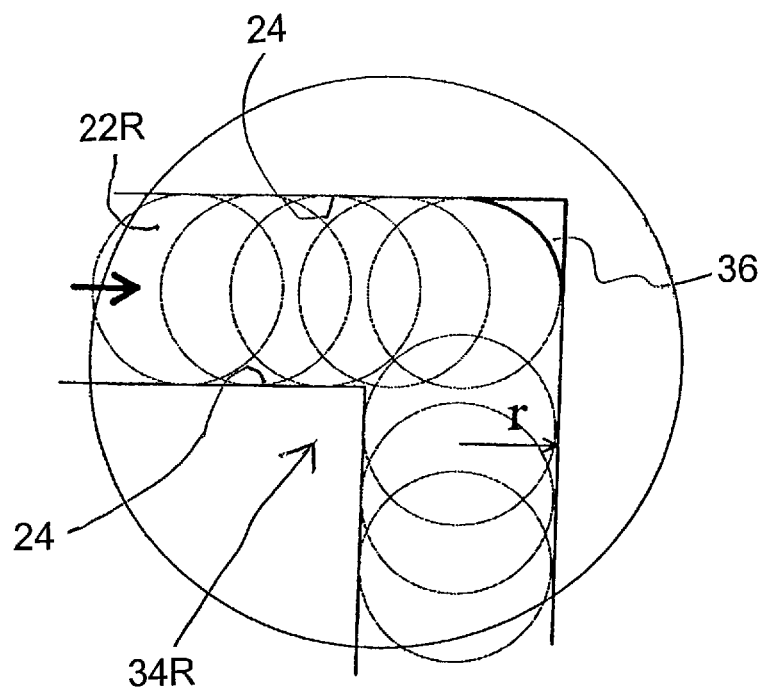

METHOD FOR FABRICATING THREE DIMENSIONAL MODELS

CROSS REFERENCE TO RELATED APPLICATIONS

This application relates to and claims benefit of U.S. Provisional Application Ser. No. 61/490,247 filed May 26, 2011.

FIELD OF THE INVENTION

The present invention relates to a method for constructing three dimensional models and, in particular, to a method and system for fabricating three dimensional models by the successive deposition of layers of model material comprising the model as well as of layers sacrificial material comprising a supportive shell around the model.

BACKGROUND OF THE INVENTION

Various methods and systems for construction of three dimensional models or objects have been developed for a number of applications, including the rapid fabrication of prototypes and the low volume fabrication of models and objects of varying degrees of complexity.

The need for rapid, low cost, low volume fabrication of models and parts has generally been met by various three dimensional (3D) modeling processes that employ layer by layer building processes. According to typical three dimensional modeling processes of the prior art, a model or a part is built up by the successive deposition of layers generally comprising a "model" material forming the final part to be manufactured and a sacrificial material that provides support for the model material during the building or fabrication process. Following completion of the fabrication or building process, the sacrificial material is subsequently removed thereby leaving the model material which forms the final part to be manufactured.

Typical examples of three dimensional modeling processes of the prior art include, for example, Householder '508, U.S. Pat. No. 4,247,508, which describes a modeling process that employs two substances, one a fill material and the other a mold material, that are deposited layer by layer to build an article. The two materials in each layer are not in contact with each other while the layer is being formed because Householder '508 uses a grid to separate the two materials as they are being deposited. After the materials in each layer are deposited, the grid is moved to the next layer so that the two materials may fill the space left by the removed grid and thereafter solidify in contact with each other in the same layer.

Helinski, U.S. Pat. No. 5,136,515, describes a method wherein a three dimensional model is produced layer by layer by jetting droplets of at least two solidifiable materials, one material forming the article and a second material forming a support for the article. The second material is subsequently removed by heating, cutting, melting, chemical reacting, and so on, to leave the desired article.

Penn, U.S. Pat. No. 5,260,009, describes a system and process for making three dimensional objects by dispensing layer upon layer of modeling material using an inkjet which is turned "on" or "off" according to a two dimensional data map of each layer of the object. The two dimensional data map is stored and relayed by a microprocessor and defines locations on a matrix at which printing is to occur in a manner such as is used in printing images using raster scan printing.

Sanders, Jr. et al., U.S. Pat. No. 5,506,607, describes a system for building three dimensional models by vector plotting layer-upon-layer applications of solidifiable substances. The layers are formed by expelling minuscule beads of the substances in a liquid or flowable phase onto a platform from one or more jets wherein the jets and platform are relatively movable in the X, Y and Z coordinate system and the beads are deposited along vectors during X-Y relative movement.

Sanders, Jr. et al., U.S. Pat. No. 5,740,051, describes a method and apparatus for producing a three dimensional model by forming a continuous plurality of parallel layers of modeling material by repeatedly producing a plurality of bead producing drops of the modeling material for deposition at desired locations, controlling the locations and timing of deposition to produce vectors in any and all directions required to produce an outer surface defining a wall of a layer with a desired surface finish, and adjusting the distance of the location of drop production to the location of drop deposition in preparation for the formation of a subsequent layer.

Penn et al., U.S. Pat. No. 6,175,422, describes a method and process for computer-controlled manufacture of three dimensional objects by dispensing a layer of a first insoluble material, such as a liquid, onto a platform at predetermined locations corresponding to a cross-section of the object, which then hardens. A second material, preferably water soluble, is then sprayed onto this layer to thereby encapsulate the hardened insoluble material. The uppermost surface of this encapsulant is planed, thus removing a portion of the encapsulant to expose the underlying insoluble material for a new pattern deposition. After the resulting planing residue is removed, another layer of liquid, insoluble material is dispensed onto the planed surface. The insoluble material can be of any color and may vary from layer to layer, and from location within a layer to location with a layer. These steps are repeated, until the desired three dimensional object, encapsulated in the soluble material, is completed. At this point, the object is either heated or immersed in solvent, thereby dissolving the soluble material and leaving the three dimensional object intact.

Other systems and methods of the prior are described, for example, in U.S. Patent Publication No. 2009/0252821 which relates to a method of fabricating a model by deposition of a model material and a sacrificial material in layers wherein the sacrificial material which defines the bounds of the model is deposited drop by drop and the model material is deposited at high speed by spraying, while U.S. Patent Publication No. 2010/0021638 additionally describes the use of a third material to construct the layers and U.S. Pat. No. 6,019,814—relates to the use of a nozzleless, ultrasonic device for the sequential deposition of the materials.

U.S. Patent Publication No. 2005/087897 relates to a variation of the basic method for constructing a model by deposition of successive layers of a model material comprising the model and shell material enclosing the model material wherein certain layers may be deposited as partial layers to reduce the volume of material to removed when each layer is planed and to permit the construction of more complex geometries in the layers.

U.S. Pat. No. 5,209,878 relates to the use of either thin partial layers of material or a material capable forming a meniscus in the edge regions between successive layers of different dimensions to reduce or eliminate "stairstep" voids created at the edges of layers having different dimensions.

U.S. Patent Publication No. 2002/0129485 describes a system which is an agglomeration of previously known systems for fabricating three dimensional objects which thereby provides a very flexible but complex system capable of achieving features of a wide variety of methods.

Other prior art systems employ methods somewhat analogous to those used to construct three dimensional objects as successive layers of different materials, but as adapted specifically and essentially to object molding processes. For example, U.S. Patent Publication No. 2004/0089980 describes a method for fabricating three dimensional models by deposition and machining of three or four successive thick layers, thereby concurrently forming a mold for the object and the object itself. The layers include including a first additive (non-sacrificial) layer which is machined to define the bottom contour of a next layer, which is a second additive (non-sacrificial) layer. The second additive (non-sacrificial) layer is deposited on the first subtractive (sacrificial) layer and machined to define the upper contour of the second additive (non-sacrificial) layer, which is the top of the finished model, with a second subtractive (sacrificial) layer being deposited and machined, if desired. The subtractive (sacrificial) material is removed when all layers are completed, thereby leaving a model formed of the additive (non-sacrificial) material.

U.S. Pat. No. 7,003,864 describes a method that is generally similar to that described in U.S. Patent Publication No. 2004/0089980 in depositing and machining three layers which concurrently form a mold for an object and the object itself, including depositing and planing a base layer of support material, depositing and removing regions of a second layer to form a mold of the part, adding a construction material to the removed regions of the second layer, and planing or machining the support and construction materials of the second layer.

The methods and systems of the prior art, for fabricating three dimensional models and objects, however, each have a significant number of fundamental problems.

For example, certain systems, such as those described in U.S. Patent Publication No. 2002/0129485, U.S. Patent Publication No. 2004/0089980, U.S. Pat. No. 7,003,864, fabricate objects or molds by machining the objects or molds from relatively thick layers of material. Such systems, however, require the removal of significant amounts of material by machining processes and tools that are capable of the desired precision and often require a variety of machining tools heads in order to obtain the desired contours in the objects or molds, so that such systems and are typically slow and wasteful and requiring complex, expensive machining components or elements.

Other of the systems and methods of the prior art, such as those described in U.S. Pat. Nos. 4,247,508, 5,136,515, 5,260,009, 5,506,607, 5,740,051, 6,175,422, U.S. Patent Publication No. 2009/0252821, U.S. Patent Publication No. 2005087897, U.S. Pat. No. 5,209,878, and U.S. Patent Publication No. 2002/0129485, fabricate objects by the deposition and selective removal of thin layers of two or more materials, thus allowing the fabrication of more complex objects by relatively less complex or expensive systems. Such systems, however, require that at least one material be deposited on the layers, during the building process, by a drop-by-drop deposition process in order to define the surfaces of the object with the desired precision but this results in a relatively slow building processes.

The present invention provides a solution to many of the above as well as other related problems of the prior art.

SUMMARY OF THE INVENTION

Wherefore, it is an object of the present invention to overcome the above mentioned shortcomings and drawbacks associated with the prior art.

An object of the present invention is to deposit both the model material and the sacrificial material at rapid deposition rates so as to facilitate rapid production of the composite model. Preferably both the model material and the sacrificial material are deposited at roughly the same deposition rates.

A further object of the invention is to facilitate formation of one or more channels, troughs, trenches or grooves in the currently being fabricated build layer of the composite model and subsequently fill each of the one or more channels, troughs, trenches or grooves with the sacrificial material and thereby form a continuous border or boundary between adjacent areas of the model material.

Yet another object of the present invention is to form, by a removal process, the one or more channels, troughs, trenches or grooves in the fabricated layer of the composite model so that at least the lateral walls, of the model to be manufactured or fabricated, are substantially planar and vertical and thereby provide the model with a very smooth and higher surface quality finish than is achievable many prior art manufacturing or fabrication techniques.

Still another object of the present invention is to remove the model material, during formation of the one or more channels, troughs, trenches or grooves in the currently being fabricated layer of the composite model, at a relatively high rate of speed, to increase the fabrication rate of the composite model.

The present invention further relates to a method of fabricating a three dimensional model from a composite model formed by a plurality of layers with the composite model comprising at least one shell material encasing and enclosing a build material, the method comprising the steps of: (1) depositing a build layer of the build material onto a preceding layer; (2) removing a selected area of the build material from the deposited build layer; (3) depositing the shell material in any removed selected area of the build material; and (4) reducing the build layer to a desired final thickness for supporting a next subsequent build layer; and (B) repeatedly repeating steps (1) through (4) for each build layer until the composite model is completed.

The present invention further relates to an apparatus for fabricating a three dimensional model from a composite model formed by a plurality of layers with the composite model comprising at least one shell material encasing and enclosing a build material, the apparatus comprising a rapid deposition spray for depositing the build material on a build layer, a machining device for removing selected areas of the build area, a rapid deposition shell material dispensing device for dispensing shell material into the selected removal areas, and a material reducing device for reducing a height of the build layer to a final thickness for supporting a subsequent build layer; the apparatus fabricating the three dimensional model by the steps of: (1) depositing a build layer of the build material onto a preceding layer; (2) removing a selected area of the build material from the deposited build layer; (3) depositing the shell material in any removed selected area of the build material; and (4) reducing the build layer to a desired final thickness for supporting a next subsequent build layer; and (B) repeatedly repeating steps (1) through (4) for each build layer until the composite model is completed.

BRIEF DESCRIPTION OF THE DRAWINGS

The invention will now be described, by way of example, with reference to the accompanying drawings in which:

FIG. 1 is an isometric view of an exemplary final model manufactured by the process of the present invention;

FIG. 1F is a diagrammatic top plan view of a current build layer, following formation of one or more removal area(s), channel(s) or region(s), while FIG. 1G is a diagrammatic cross sectional view of the build layer, along section line 1G-1G of FIG. 1F;

FIG. 1H is a diagrammatic top plan view of the current build layer, following deposition of the sacrificial material in the removal area(s), channel(s) or region(s), while

FIG. 1J is a diagrammatic top view of the current build layer, following planing and cleaning of the build layer, while FIG. 1K is a diagrammatic cross sectional view of the build layer, along section line 1K-1K of FIG. 1H;

FIG. 1L is a diagrammatic side elevational view showing a plurality of build layers for forming the composite model according to the present invention;

FIG. 2A is an isometric view of an exemplary final model having undercut and void features with certain build layers of interest depicted;

FIG. 2G is a diagrammatic cross sectional view of the composite model, taken along the section line 2F-2F of FIG. 2A, following removal of the extraneous model material;

FIG. 3C is an enlarged, diagrammatic top plan view of area A of FIG. 3B showing the manufacturing problem associated with an interior reentrant angle;

DETAILED DESCRIPTION OF THE INVENTION

Figure 1A:
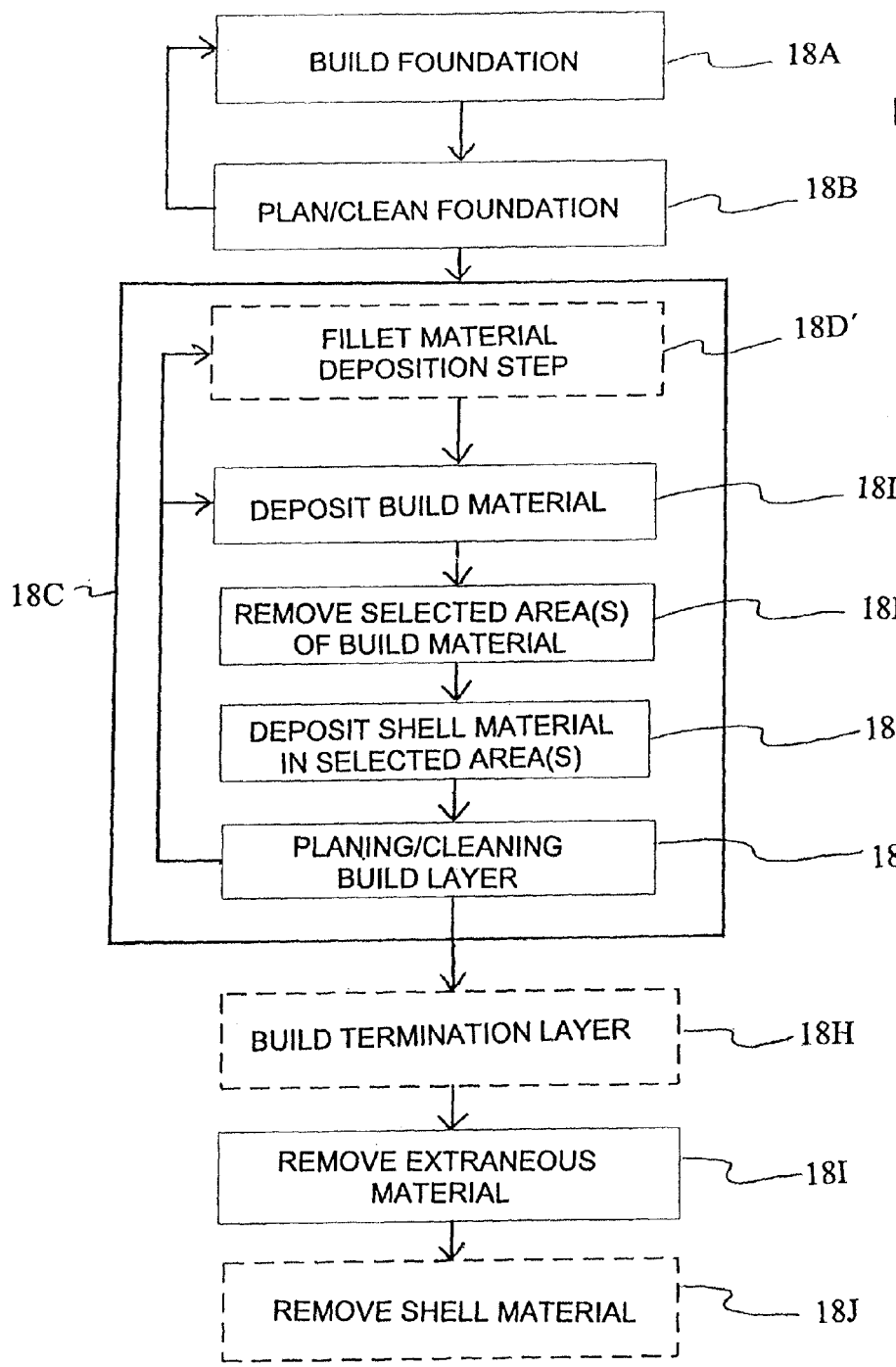
FIG. 1A is a diagrammatic flowchart depicting the various steps for fabricating the composite model according to the present invention.

A. Introduction and Exemplary Fabrication of a Model

As will be described in detail in the following, the present invention is directed to a method and a system for fabricating three dimensional models by the fabrication of a composite model formed of successive layers of materials, with each successive layer of material typically comprising both a build material, generally comprising the model material, and a support material, generally comprising a sacrificial material. The support material is typically deposited so as to form shell which completely surrounds and encases the build material and, following at least one removal process, either the exterior outwardly facing surface of the shell or the exterior outwardly facing surface of the build material, if the shell is also removed, forms the exterior outwardly facing surface of the final model.

As note above, it is to be appreciated that, according to the present invention, each layer of the composite model is typically formed from the build (e.g., model) material, the shell (e.g., sacrificial) material or a combination of both materials while one or more foundation layers and one or more termination layers are typically formed from only one material, e.g., the sacrificial material or possibly the model material. In the intermediate layers which comprise both the build material and the shell material, the current layer of the composite model is initially formed by the deposition of a layer of the build material, for example, the model material, extending over an area greater than the maximum length and width dimensions of any subsequent layer of the composite model and, thereafter, one or more selected areas of the build material, typically in the form of a "channel", a "trough", a "trench" or a "groove" extending along vertical surface or surfaces of the model area or areas defining either a top or a bottom surface of a void in the composite model, are removed from the build material in that layer, by a precision machining process, to a depth extending normal from the top of the current layer of the build material to the top of the immediately adjacent preceding layer. Typical dimensions for the channel, the trough, the trench or the groove are a depth of between 0.00025 and 0.005 thousands of an inch or so and a width of between 0.00025 and 0.005 thousands of an inch or so.

The area or areas from which the build material is removed by the removal process are then subsequently filled with the shell material, for example, a sacrificial material, so as to completely fill and enclose the removed area or areas with the shell material and finally the current layer is then planed to the desired surface thickness. Following planing of the surface, the planed layer is then cleaning or vacuuming to remove dust and debris and thereby complete fabrication of that currently layer so that the partially completed composite model is thus prepared for fabrication of the next subsequent build layer of the model. This process is then repeated numerous times until fabrication of the three dimensional composite model is eventually completed.

As noted above, this method is then repeated, layer by layer, numerous times with each layer being formed of the build material, the shell material, or both the build and the shell materials, as required depending upon the specific details or features of the composite model in each layer being fabricated. It is to be appreciated that either, or both, the build material and the shell material may be used to construct or fabricate support regions or areas for subsequent layers of the shell and/or the build materials.

Referring now to FIGS. 1-1L, the process of fabricating, according to one embodiment of the present invention, the exemplary final model 10, shown in FIG. 1, will now be discussed. In the following discussion, the build material will be generally referred to as the model material 14 while the shell material will be generally referred to as the sacrificial material 16. It is to be appreciated, however, depending upon the particular application, the build material may be the sacrificial material 16 while the shell material may be the model material 14.

In FIG. 1, a final model 10, formed from a composite model 10C (see FIG. 2A) which comprises numerous layers 12 of the model material 14 and/or the sacrificial material 16, is generally shown. Each layer of the composite model 10C is typically includes both the model material 14 and the sacrificial material 16 which are deposited in selected areas of the build layer with one material being deposited before the other.

Figure 1B:
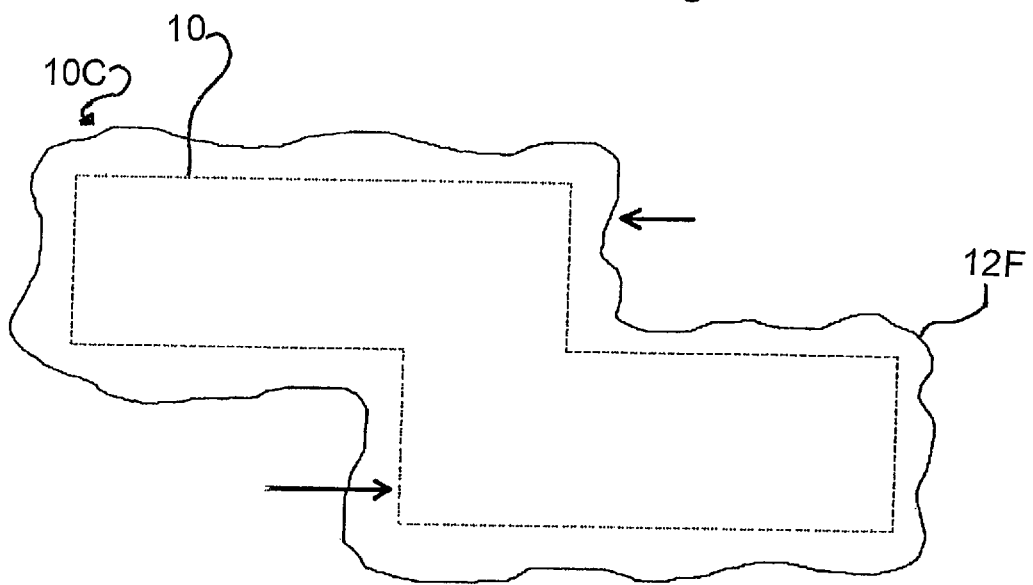
FIG. 1B is a diagrammatic plan view of a deposited layer of the foundation material upon which the composite model is to be fabricated.

As shown in FIGS. 1 and 1B, the exemplary model 10 comprises a plurality of layers 12 with the layer of the present discussion comprising the bottom most layer 12F of the composite model 10C as constructed or fabricated according to the method of the present invention which, as described in detail below, generally includes initial steps 18A and 18B followed by repetitive step 18C, which comprises a sequence of steps 18D-18G, and may conclude with a termination step 18H, although this may not be necessary, and at least one removal step 18I and possibly a second removal step 18J.

As illustrated in FIG. 1B, the fabrication of the composite model 10C begins with a step 18A in which one or more foundation layers 12F are first deposited on a desired model support surface or table T, such as a vertically movable table, where the one or more foundation layer(s) 12F are typically fabricated solely from the sacrificial material 16, for example, and such layers thereby forming the foundation for a shell 20 so that, following completion of the composite model 10C as described further hereinafter, the shell totally surrounds encapsulates the composite model 10. As will be described, the shell 20 totally encases the final model 10 and protects the model material 14, from which the final model 10 will eventually be formed, from the subsequent processes by which any extraneous model material 14 is eventually removed from the composite model 10C to thereby result in the final model. It is also possibly that the exterior surface of the shell can be utilized to from the final model.

Figure 1C:
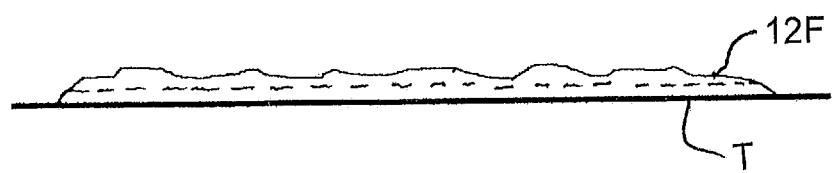
FIG. 1C is a diagrammatic side elevational view of FIG. 1B of the deposited foundation layer of FIG. 1B.

The number of foundation layers 12F, required for any given composite model 10C, can vary from one to numerous layers and may be determined, for example, by the properties of the sacrificial material 16, the thickness of the initial foundation layer or layers 12F, the design of the final model 10 and, in particular, the lower regions of the final model 10, the accuracy of the model support surface or table T, etc. As illustrated in FIG. 1B, the area covered by the foundation layer or foundation layers 12F must, at a minimum, exceed the maximum length and the maximum width dimensions of the final model 10 for each one of the subsequent vertically higher build layer 12M of the composite model 10C by an amount equal to or greater than the minimum width and/or minimum length of the areas of the model material 14 that, as discussed below, are removed from subsequent, higher layers 12 of the composite model 10C during construction or fabrication those subsequent build layer 12M. The extent (i.e., the maximum width and length dimensions) of the foundation layer or layers 12F thereby ensure that each subsequent build layer 12M of the composite model 10C are fully vertically supported by the foundation layer or layers 12F formed on the model support surface or table T. As generally indicated in FIG. 1C, the thickness of each foundation layer 12F, as initially deposited on the model support surface, must also exceed the intended final thickness of that the foundation layer 12F.

Figure 1D:
FIG. 1D is a diagrammatic side elevational view of FIG. 1B following planing of the deposited foundation layer.

Following sufficient solidification of each one of the foundation layers 12F, the just deposited foundation layer 12F is typically planed to the intended final thickness of the foundation layer 12F and sufficiently cleaned, e.g., by blowing or vacuuming for example, during step 18B, thereby to provide a smooth, level surface for deposit of the subsequent, next foundation layer for the composite model 10C, as illustrated in FIG. 1D. Steps 18A and 18B are repeated and once a sufficient amount of foundation layers 12F are deposited upon the vertically movable table T, e.g., typically when the entire surface area of the top most foundation layer 12F was at least partially planed thereby indicating the top most foundation layer 12F perfectly is level with the build apparatus, then construction of the actual composite model 10C can commence.

Figure 1E:
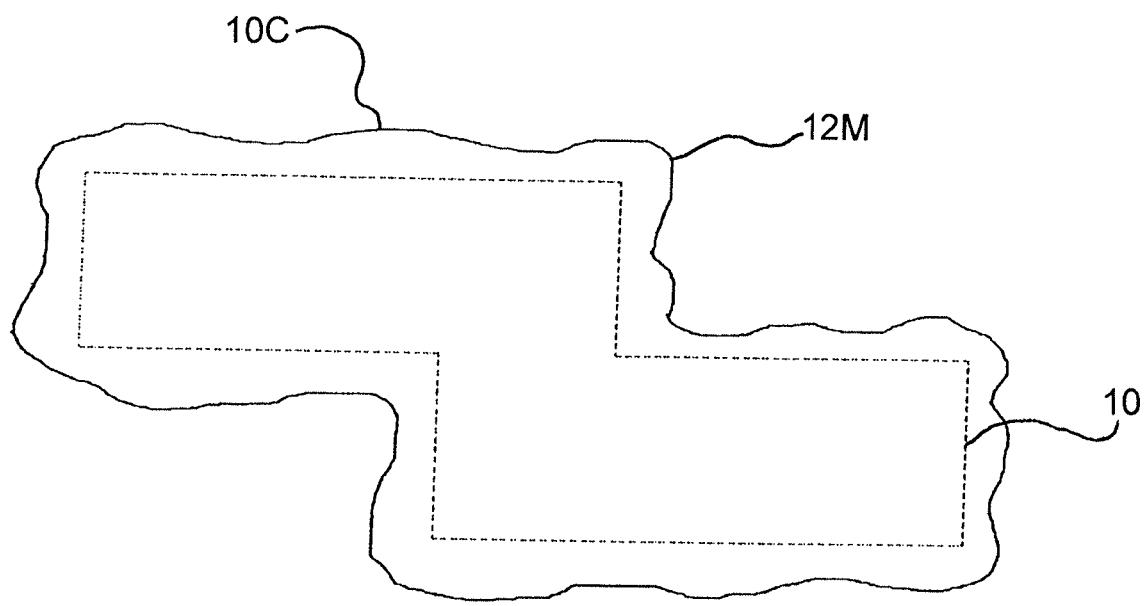
FIG. 1E is a diagrammatic plan view of the deposited build layer with the maximum extent of subsequently vertically higher build layers of the composite model shown in dashed lines.

The composite model construction begins during build step 18C which includes the repetition of steps 18D though 18G. During step 18D, as illustrated in FIG. 1E, a first build layer 12M of the model material 14 is deposited upon the top most foundation layer 12F and this layer of the model material 14 typically forms a boundary or a transition between the foundation layers 12F and the composite model 10C. This first build layer 12M of the model material 14 (as generally shown in FIG. 1E) typically does not include any removal area(s), channel(s) or region(s) 22R therein and, once deposited, the first build layer 12M of the model material 14 is then planed and cleaned, as discussed herein, during build layer planing/cleaning step 18G.

During step 18D, a second build layer 12M of model material 14, as also illustrated in FIG. 1E, is deposited on top of the first build layer 12M of the model material 14. The dimensions of the layer of the deposited model material 14 for the first, the second and for each subsequent build layer 12M of the model material 14 of the composite model 10C, must again extend over an area that is again equal to or greater than the maximum extent, i.e., the maximum width and length dimensions, of the final model 10 for all subsequent, vertically higher build layers 12M of the composite model 10C by an amount equal to or greater than the minimum width or the minimum length of the areas of the model material 14 that are removed from each subsequent higher build layer(s) of the composite model 10C during construction or fabrication of those subsequent layers. The extent (i.e., the maximum width and length dimensions) of each build layer 12M thereby ensures that all subsequent layers of the composite model 10C are completely supported vertically by the vertically lower build layers 12M. Also, the model material 14 is again deposited at a thickness equal to or preferably somewhat greater than the intended final thickness of the build layer 12M to ensure that each build layer 12M can be subsequently planed to the intended final thickness and subsequently cleaned. FIG. 1E illustrates the maximum extent, in dashed lines, of the current build layer 12M for the model 10 shown in FIG. 1.

Figure 1F:
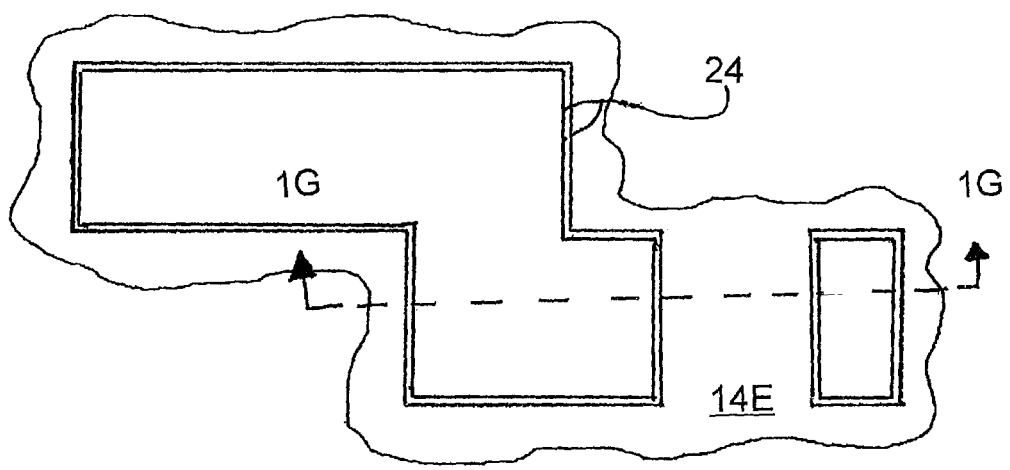

FIG. 1F is a diagrammatic top view of the current build layer 12M, following completion of removal step 18E, while FIG. 1G is a diagrammatic cross sectional view of the build layer 12M along section line 1G-1G of FIG. 1F. Removal step 18E generally comprises the removal of a minor portion the deposited model material 14, in one or more selected the removal area(s), channel(s) or region(s) 22R that extend along any surface 24 or surfaces 24 of the composite model 10C in or on that the build layer 12M, by a precision routing, drilling, boring or some other machining process. During this material removal process, one or more selected areas of the deposited model material 14, in the current build layer 12M, are removed to a depth extending from the top of the current build layer 12M precisely to the beginning of the immediately adjacent preceding build layer 12M, but generally without removing any material from the immediately adjacent preceding build layer 12M. Accordingly the routing, drilling, boring or other machine tool must have a generally flat or planar leading surface so as not to router, drill, bore or machine into the immediately adjacent preceding build layer 12M. FIGS. 1F-1G generally illustrate completion of the removal step 18E, of the method of the present invention, once the selected areas of the model material 14 are removed. It is to be borne in mind that the removal of a portion of the model material 14, from the removal area(s), channel(s) or region(s) 22R and the radially outwardly facing surface of the removal area(s), channel(s) or region(s) 22R, partially defines the exterior surface of the shell 20 while the radially inwardly facing of the removal area(s), channel(s) or region(s) 22R partially define the exterior surface of the composite model 10C of the build layer 12M generally being constructed 10.

The removal area(s), channel(s) or region(s) 22R are typically of the form of one or more "recess(es)", a "trench(es)" or a "groove(s)" extending along the surface 24 or surfaces 24 of the composite model 10 in the current build layer 12M and are of a desired width or thickness which is equal to the desired width or thickness of the shell 20 in that region and layer of the composite model 10. It must be noted, however, that the removal area(s), channel(s) or region(s) 22R may comprise a larger region, such as a region defining either a top horizontal surface or the bottom horizontal surface of a void or space in the preceding build layer 12M or in the next higher build layer 12M of the composite model 10.

Figure 1I:
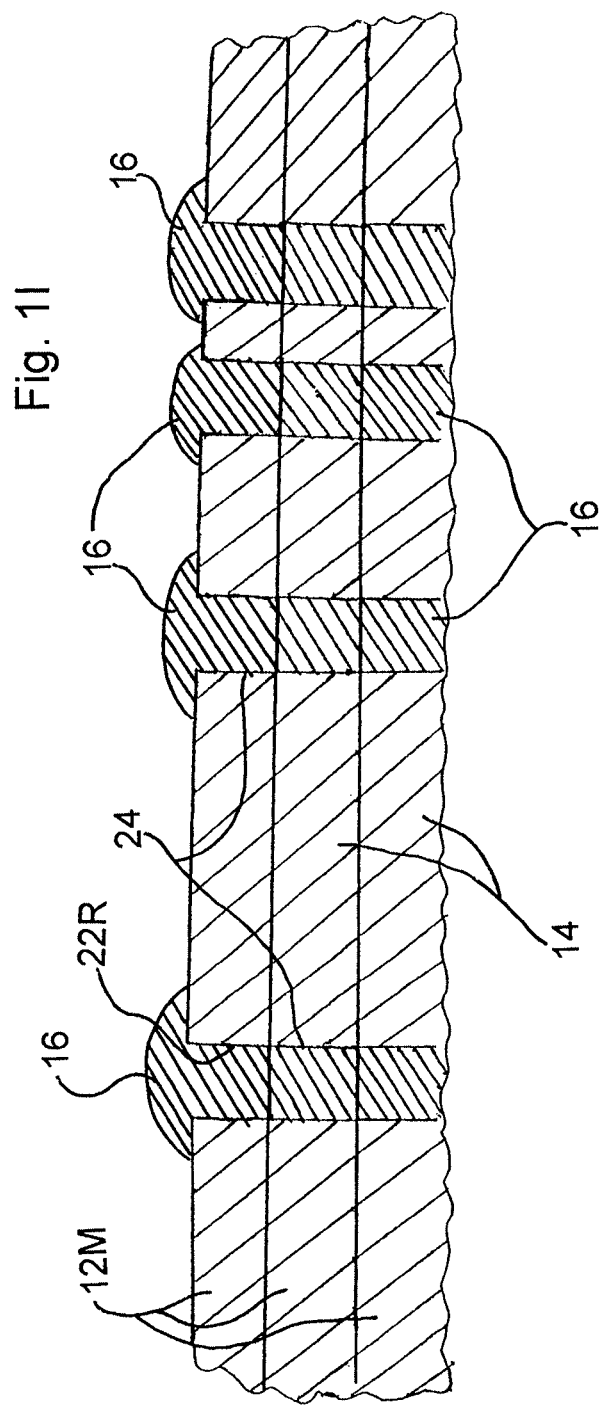
FIG. 1I is a diagrammatic cross sectional view of the build layer, along section line 1I-1I of FIG. 1H.

FIG. 1H is a diagrammatic top view of the current build layer 12M, following completion of deposition step 18F, while FIG. 1I a side sectional side view of the current build layer 12M, along section line 1I-1I of FIG. 1H, During step 18F, the sacrificial material 16 is deposited in the removal area(s), channel(s) or region(s) 22R of that build layer 12M, with such deposition typically occurs by a rapid deposition process such as spraying. The deposition of the sacrificial material 16 in the removal area(s), channel(s) or region(s) 22R thereby creates one or more sacrificial material "inlay" areas 22S which are filled with the sacrificial material 16 and thereby form part of the encapsulating shell 20 of the sacrificial material 16 which encloses the outwardly facing surfaces 24 of the composite model 10 in that build layer 12M. It is to be appreciated that the sacrificial material 16, when deposited over and filling the removal area(s), channel(s) or region(s) 22R from where the model material 14 was removed, must be still sufficiently molten so as to flow into and completely fill the entire space of the removal area(s), channel(s) or region(s) 22R. It is to be noted that the deposition or filling of the sacrificial material 16 extends downward from the current build layer 12M to the top surface of the immediately preceding adjacent layer 12P and has a thickness which is at least equal to, or more preferably greater than, the intended final thickness of the current build layer 12M. It will also be noted that one or more regions of the sacrificial material 16 on the current build layer 12M may, in turn, be enclosed within a complete or partial shell or mass of extraneous model material 14E that, while not comprising a part of the intended final model 10, was not removed from the current layer 12.

According to the present invention, the surfaces 24 of the composite model 10C along which removal areas 22R are located include each surface 24 of the composite model 10 that is present in the mostly recently deposited current build layer 12M, any surface 24 of the composite model 10 of a next higher build layer 12M that would be adjacent the current build layer 12M, and any surface 24 of the composite model 10 on the preceding layer 12 that is adjacent to the current build layer 12M.

Figure 1J:
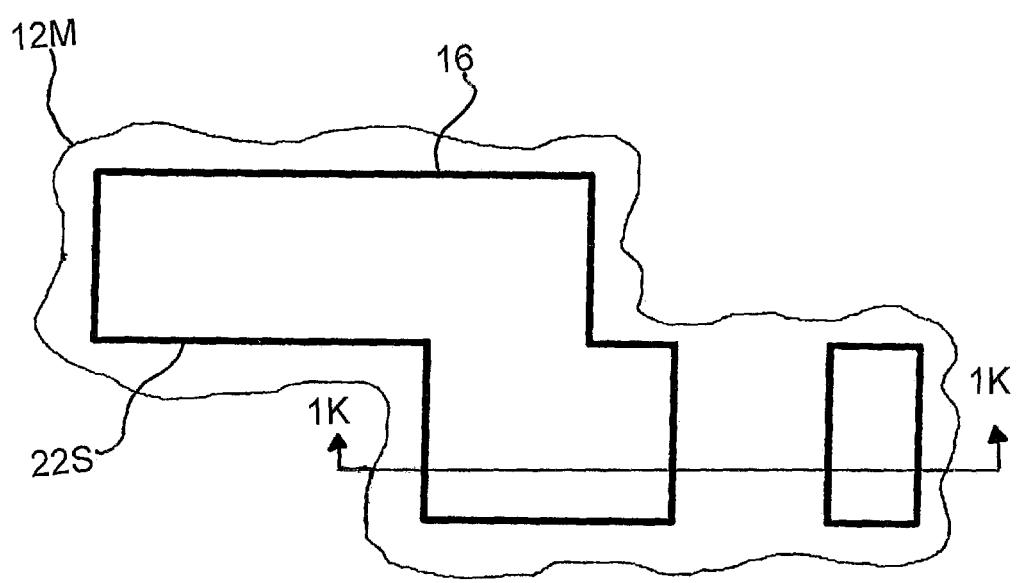

FIG. 1J is a diagrammatic top view of the current build layer 12M, following completion step 18G of the method of the present invention, while FIG. 1K is a diagrammatic cross sectional view of the build layer 12M, along section line 1K-1K of FIG. 1F. During step 18G, the current build layer 12M, including the deposited sacrificial material 16 forming the part of the encapsulating shell 20 enclosing the surfaces 24 of the composite model 10 on the current layer, as well as the model material 14 are all planed to the desired final thickness of the current build layer 12M and then suitably cleaned by either a blowing, vacuuming or some other dust and debris removal process, thereby completing formation of that build layer 12M. The completion of steps 18D to 18G thereby results in formation of a top most build layer 12M which now forms a smooth, level support surface for deposition of the next subsequent build layer of the composite model 10 to be fabricated.

Process step 18C, which includes process steps 18D-18G, is then repeatedly repeated, numerous time as necessary or required, until the entire composite model 10C is finally completed, with each layer 12 generally comprising the model material 14 or the sacrificial material 16, or a combination of both materials, as necessary, so as to result in completion of the composite model 10 and the encapsulating shell 20 in each build layer 12M.

Following construction of the final or top most build layer 12M that includes at least one part of the composite model 10, during step 18H, one or more terminal layer or layers 12T, which are fabricated solely from the sacrificial material 16, are then deposited on top of the final model layer 12M, as diagrammatically illustrated in FIG. 1M. As with the case of the foundation layers 12F, the terminal layers 12T generally completely formation of the top surface of the encapsulating shell 20 which completes formation of the top most horizontal surface that completes encapsulation of the composite model 10C so as to support the composite model 10C and thereafter protect the model material 14 of the composite model 10C during removal of any extraneous model material 14 from the composite model 10C, as discussed below in further detail. The number of terminal layers 12T required for any given composite model 10C can vary and again may be determined, for example, by the properties of the sacrificial material 16, the thickness of the terminal layer or layers 12T, the design of the composite model 10C and, in particular, the upper regions of the composite model 10C, etc.

The terminal shell layer or layers 12T, if applied, generally covers all areas of the composite model 10C that remain exposed upon completion of the last fabricated layer 12M that includes at least one part of the composite model 10C and again must be deposited to a sufficient height that at least meets, and more preferably exceeds, the intended final thickness of that layer 12T. If more than one terminal layer 12T is required, any sacrificial material 16 for each terminal layer 12T preceding the final terminal layer 12T and that exceeds the intended final thickness of the terminal layer 12T is removed after solidification of the sacrificial material 16, for example, by a planing process so as to provide a smooth, level surface on which the next terminal layer 12T is deposited.

Lastly, and upon completion of the composite model 10C, the sacrificial material 16 as well as all extraneous model material 14E, not forming a part of the final model 10, are selectively removed during one or more removal steps, illustrated by removal step 18I. During removal step 18I, the extraneous model material 14E is first removed and then, during a separate second removal step 18J, the encapsulating shell 20 comprising the sacrificial material is removed. The process or methods for individually removing the extraneous model material 14 and the sacrificial material 16 may employ solvents for dissolving one of the materials, heating of the composite model 10C to different temperatures for melting one of the materials, and so on and any combination thereof which are well known in the art. Alternatively, both the model material 14 and the sacrificial material 16 may be removed from the composite model 10C during a single removal process, during removal step 18I.

Considering certain aspects of the above described basic method of the present invention in further detail, and according to the present invention, the model material 14 may be deposited as a solid or a liquid, but must have characteristics which allow the model material 14 to entirely fill the area of the current layer 12 being fabricated to a uniform thickness, density and/or height that at least meets and more preferably exceeds the intended final thickness of that layer 12 following solidification of the model material 14 into its solid state and, if deposited as a liquid, the model material 14 must sufficiently cure, freeze or solidify into a solid state very rapidly following deposition. The model material 14 may be deposited by a selective or non-selective processes wherein possibly non-selective processes include roller transfer, a spray or an extrusion process which typically deposits the model material 14 at a much higher deposition rate than selective techniques such a jetting individual drops of the model material 14. As described, it is necessary that the area covered by the model material 14 include, at a minimum, the entire area that is to be occupied by the model material 14 in the current model material layer 12M and by all subsequent build layers 12M of the composite model 10C. It is also necessary that each build layer 12M includes sufficient excess area at the perimeter of the current build layer 12M so as to ensure that a sufficiently wide removal area 22R can be excavated or removed from the build material 12 around the model surfaces 24 and thereafter subsequently accommodate the sacrificial material inlays areas 22S that form the encapsulating shell 20 around the composite model 10C. The model material 14 is deposited over an area that, at a minimum, is equal to, or more preferably exceeds, the extent of all subsequent build layers 12M even when this area exceeds the area required by the current build layer 12M. This extended coverage ensures that there is a surface upon which subsequent layers, that include larger portions of the composite model 10C than those in the current layer 12, can be deposited and adequately supported.

The sacrificial material 16 may likewise may be deposited into removal areas 22R as a solid or a liquid. If the sacrificial material 16 is deposited as a liquid or a semi-solid, the sacrificial material 16 must sufficiently cure, freeze or solidify into its solid state quite rapidly following deposition, and must have characteristics allowing the sacrificial material 16 to entirely and completely fill all of the interior space within the area(s), channel(s) or region(s) 22R created in the model material 14 to a generally uniform thickness and density without leaving any gap(s), crack(s), opening(s) and/or void(s) within any portion of the removal area(s), channel(s) or region(s) 22R that could be permeated during the subsequent removal of the extraneous model material. The sacrificial material 16 may be deposited by a selective or a non-selective process wherein such non-selective processes include a roller transfer, a spray or an extrusion process and typically deposits the model material 14 at a much higher deposition rate than selective techniques such a jetting individual drops of the model material 14. Other means or mechanisms, such as a pressure plate or roller, may be employed to achieve the desired final filling of the sacrificial material 16 into the areas to be occupied by the sacrificial material 16. Following deposition of the sacrificial material 16, the thickness of the sacrificial material 16 must at least meet and more preferably exceed the intended final thickness of that layer 12 in which it is being deposited.

According to the present invention, the accuracy, precision and characteristics of the process by which the model material 14 is removed from the build layer 12M, during step 18E discussed above, determines the accuracy and the precision of the final model 10 because the vertical side wall of either the model material 14, exposed by the removal process described above, or the exterior vertical side wall of the shell 20 generally forms an exterior perimeter surface 24 for the final model 10 and may also form an exterior surface 24 of the final model 10 on a preceding layer 12. In many applications, it is desirable to employ a milling tool, or some other similar but comparable mechanical material removal process or technique, in order to achieve the desired accuracy and precision equal to current high-end machining processes. It is to be appreciated that other material removal techniques, such a laser cutting or vaporization, for example, may also be utilized as long as the depth can be sufficiently controlled so as not to extend or protrude into the previous fabricated build layer 12M. Regardless of the type or kind of material removal process utilized, the quality of the outwardly facing model material 14 surfaces, resulting from the material removal process, will determine the overall surface quality and accuracy of the final model 10 to be fabricated.

The width of the removal area(s), channel(s) or region(s) 22R created, for example, along a surface 24 of the model 10 by the selective material removal process, that is, the width of the resulting sacrificial material inlay area 22S, determines the thickness of the encapsulating shell 20 and the minimum spacing distance between the model features within each layer. The removal area(s), channel(s) or region(s) 22R must be sufficiently wide to accommodate the subsequent deposition of the sacrificial material 16 at a uniform density and so as to entirely and completely fill each removal area(s), channel(s) or region(s) 22R without leaving any gap(s), crack(s), opening(s) and/or void(s) therein that could be permeated during the subsequent removal of the extraneous model material 14. The removal area(s), channel(s) or region(s) 22R must also be sufficiently narrow to permit the desired spacing distance between adjacent features of the composite model 10C.

As will be understood by those or ordinary skill in the relevant art, the width of the removal area(s), channel(s) or region(s) 22R and of the resulting inlay area 22S can be established by the size or energy of the selected removal process, the number of removal passes utilized, and so forth. It will also be understood that the selective removal and cleaning process must result in adequate cleaning of each removal area(s), channel(s) or region(s) 22R so that it is completely free from any dust, particles and/or debris because if any such dust, particles and/or debris remain within the removal area(s), channel(s) or region(s) 22R, during the subsequent deposition of the sacrificial material 16, this may result in a defect(s) and/or imperfection(s) occurring in the outer surface 24 of the final model 10 thereby detracting from the overall precision to be obtained by the method of the present invention. Consequently, either a conventional air blowing process or more preferably a conventional vacuum process, or some other adequate dust/debris removal process, is incorporated or employed after each planing step in order to thoroughly clean each one of the removal area(s), channel(s) or region(s) 22R and thereby ensure that all of the dust, particles and/or debris, created during formation of the removal area(s), channel(s) or region(s) 22R, is completely removed before depositing the sacrificial material 16 and forming the sacrificial material inlays areas 22S.

It will also be understood that during the fabrication process of the present invention, for certain geometries of the final model 10 or the composite model 10C, extraneous model material is intentionally deposited in regions located outside of the final model 10, that is, outside of the removal area(s), channel(s) or region(s) 22R created by the selective removal of the model material 14 during removal step 18E. As described, these areas of extraneous model material 14E provide a solid support structure upon which other features of the composite model 10C, in any subsequent layer(s) 12, can be deposited.

As described, the final step in the fabrication of each build layer 12M is the removal of all of the excess model material 14 and the excess sacrificial material 16, contained within that build layer 12M, which exceeds the intended thickness of that build layer 12M and typically includes the removal of all of the sacrificial material 16 that is not located within the removal area(s), channel(s) or region(s) 22R as well as typically a minor portion of the deposited model material 14. As also described, all of the model material 14 and all of the sacrificial material 16, deposited during the fabrication of each layer 12, is deposited to thickness that at least meets, and more preferably exceeds, the minimum intended thickness of that layer 12. This ensures that when the excess model material 14 and the excess sacrificial material 16 are removed from the deposited layer, the exposed surface of the completed build layer 12M surface will be smooth, uniform and free from any voids, discontinuities or irregularities and will comprise the model material 14 with the "inlays" of the sacrificial material 16 along the surfaces 24 of the composite model 10 in the build layer.

The excess model material 14 and the excess sacrificial material 16, in each build layer 12M, can be removed by employing any of a number of conventional methods or techniques which including, for example, cutting, boring, grinding, drilling, routing, boring, etc. In addition, a secondary process, such as a vacuuming, a blowing and/or a dust removal process, is typically used to remove any remaining particulate matter, dust and/or debris left as a result of the primary removal process. Alternatively, both the cutting, grinding, drilling, routing, boring, etc., and the vacuuming/cleaning steps can be combined in a single pass process step. Regardless of the material removal mechanism, process or technique for removing the model material 14 during formation of the one or more the removal area(s), channel(s) or region(s) 22R, the removal process must remove all excess material uniformly, thoroughly and completely, without leaving any surface irregularities, dust, particulate matter(s) or residual smudging or contamination, of one material by the other, and the final layer thickness must be level and precise thereby leaving a clean, smooth completed surface upon which the next subsequent build layer 12M can be deposited.

As described, the terminal layer or layers 12T are a generally an integral part of the encapsulating shell 20 that completes the enveloping of the entire final model 10 and thereby protects the final model 10 from the subsequent process or processes that are utilized or employed in order to remove the extraneous model material 14 and the sacrificial material 16 which is located on the exterior of the encapsulating shell 20. It is to be appreciated that, for some applications, the last build layer 12M may complete formation of the shell 20 thereby avoiding the need to form any terminal shell layers 12T. The terminal shell layer 12T, if utilized, typically must, at a minimum, cover all areas of the composite model 10C that remain exposed upon completion of the final build layer 12M that includes part of the composite model 10C, that is, that contains the surface 24 of the final model 10. The terminal layer 12T must be deposited to a thickness that exceeds the intended final thickness of that layer 12. If more than one terminal layer 12T is required or desired, the sacrificial material 16 for each of the successive terminal layers 12T, up to the final terminal layer 12T, and that exceeds the intended final thickness of each such successive terminal layer 12T is removed down to the intended thickness of each such terminal layer 12T so as to provide a smooth, level surface for the final terminal layer 12T.

While the above disclosure generally describes using the exterior surface of the centrally, core located model material 14 to define the overall shape of the final model 10, it is to be appreciated that the exterior surface of the encapsulating shell 20 can alternatively define the overall shape of the final model 10. In this case, then the process by which the final model 10 is obtained from the composite model 10D is thereby simplified since only one separation step is required, namely, process step 18I in which the extraneous model material 14E is removed from the composite model 10C and thereby leaving the encapsulating shell 20, comprising the sacrificial material, which defines the final model 10.

Alternatively, while the above disclosure describes using the model material 14 as the initially applied material of the current build layer the current build layer 12M and one or more removal area(s), channel(s) or region(s) 22R are then cut, ground, drilled, routered, bored, etc., in the initially applied the model material 14 which is subsequently filled with the sacrificial material 16, it is to be appreciated that the order may be reversed. That is, the initially applied material of the current build layer 12M may be the sacrificial material 16 and one or more removal area(s), channel(s) or region(s) 22R are then cut, ground, drilled, routered, bored, etc., in the initially applied the sacrificial material 16 which is subsequently filled with the model material 14. Moreover, as indicated above, the exterior surface of the centrally located sacrificial material 16 defines the overall shape of the final model 10, it is to be appreciated that the exterior surface of the encapsulating model shell 20 can alternatively define the overall shape of the final model 10. In this case, then the process by which the final model 10 is obtained from the composite model 10D is thus simplified since only one separation step is required, namely, process step 18I in which extraneous sacrificial material 16 is removed from the composite model 10C thereby leaving the encapsulating shell 20, comprising the model material 14, which defines the final model 10.

B. Further Aspects of the Method for Fabrication of a Model

Next considering further aspects of the present invention, and in particular the fabrication of a composite model 10C and the final model 10 having, for example, undercut, recesses and void features, the following will describe certain specific examples of material deposition and removal to fabricate unique construction features within the layers of interest of an exemplary composite model 10C and the final model 10.

Figure 2B:
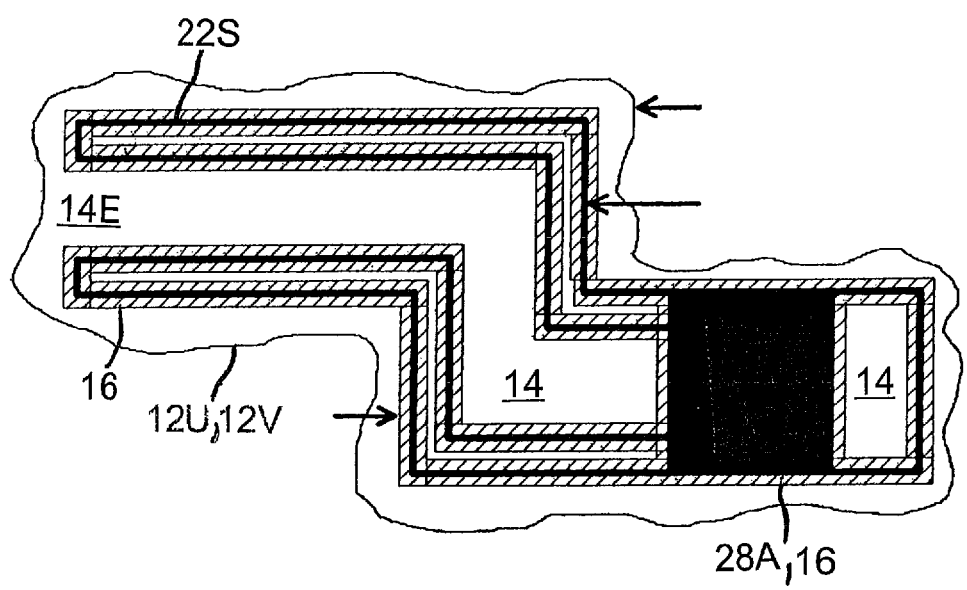
FIG. 2B is a diagrammatic top view of the bottom most build layer for forming a void.

Referring now to FIGS. 2A through 2I, further features of the method of the present invention will now be described. With reference first to FIG. 2A, this Figure is an isometric view of an exemplary model 10 having undercut and void features contained within certain build layers 12M of interest. For purposes of the following discussions, the build layers 12M of interest are identified as layers 12U, 12V, 12W, 12X, 12Y and 12Z. It will be understood that the build layers 12 represented in FIGS. 2A through 2I are not drawn to scale and are including for illustration purposes only. For example, it is to be appreciated that each composite model 10C will normally be formed by many hundreds or possibly many thousands of different sequential build layers 12M, and only a few such layers will be discussed below.

Referring first to FIG. 2B, which is a diagrammatic top plan view of the bottom most build layer 12V of FIG. 2A. As shown in FIG. 2A, the bottom most build layer 12V has a void 28A associated therewith which extends from the bottom of the composite model 10 vertically upward to build layer 12W, which is the next vertical higher build layer 12 that is deposited vertically on top of and above build layer 12V. As illustrated in FIG. 2B, all of the model material 14 in the region of the void 28A of the build layer 12V comprises a removal area, channel or region 22R where the model material 14 is removed by a suitable machining process, performed during step 18E described above. As described, this the removal area, channel or region 22R is then subsequently filled with the sacrificial material 16 in order to create a sacrificial material inlay area 22S which comprises a region of the encapsulating shell 20 thereby creating a supporting surface upon which the next vertically higher build layer, not labeled in FIG. 2B, is fabricated during the fabrication process of the composite model 10C. It must be noted that those layers 12, in the region of the void 28A extending from the bottom of the void 28A, commencing at build layer 12U and up to build layer 12V, also typically have sacrificial material inlay areas 22S comprising the model material removal area(s), channel(s) or region(s) 22R filled with the sacrificial material 16 which will be subsequently removed so as to thereby create the void 28A in the final model 10. These regions may also, however, be constructed as regions largely filled with the model material 14 surrounded by the sacrificial material inlay areas 22S wherein the model material 14 regions are released or exposed for subsequent removal by removal of the sacrificial materials, again thereby leaving an open void.

Further in this regard, it must be noted that certain composite models 10C may include captured voids 28, that is, a void 28 that is entirely enclosed by the model material 14. In such instances, the captured voids 28 may be left filled with sacrificial material 16 or must be "freed", that is, connected in some manner to an external region of the sacrificial material 16 or the extraneous model material 14 to allow the subsequent removal of the sacrificial material 16 from the void 28A so as to thereby result in completion of the desired final model 10.

Figure 2C:
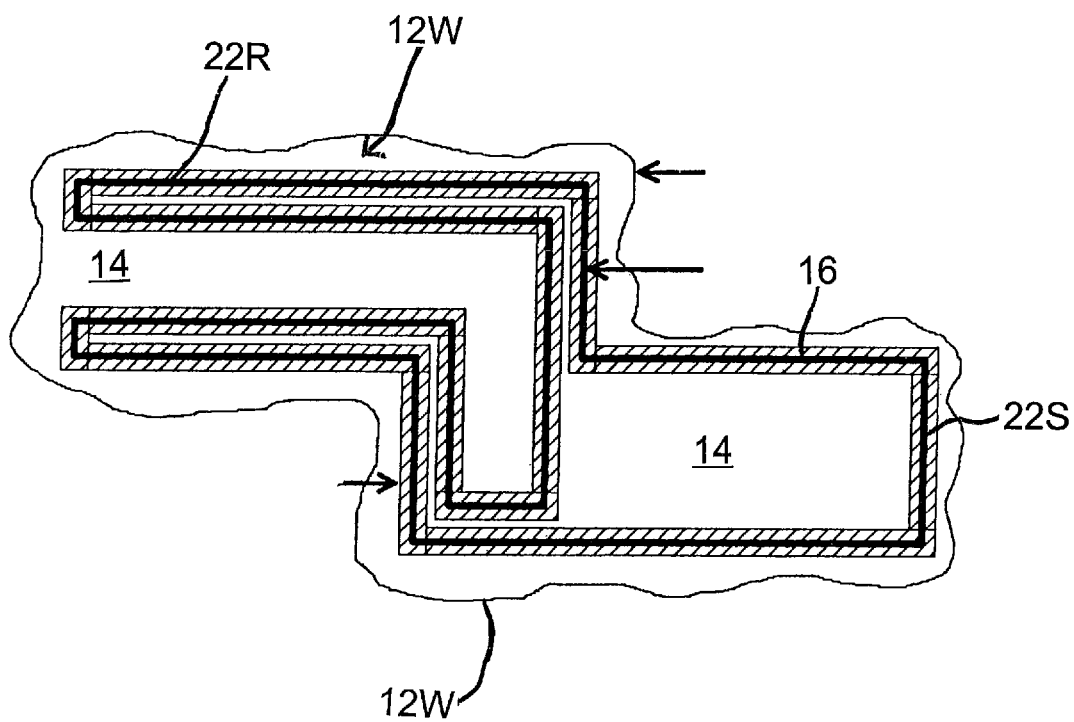
FIG. 2C is a diagrammatic top view of the build layer in the layer immediately above the void.

Referring briefly to FIG. 2C, and as discussed above with reference to FIG. 2B, the build layer 12W is the next vertical build layer 12 deposited on top of the build layer 12V, of FIG. 2A, which comprises a downward facing vertical surface 24 of the composite model 10C that forms the top most surface of which defines the top of the void 28A. In at least the region of the void 28A, therefore, build layer 12W thereby comprises the build layer of model material 14 deposited on the sacrificial material 16 comprising the corresponding region of build layer 12V.

Figure 2D:
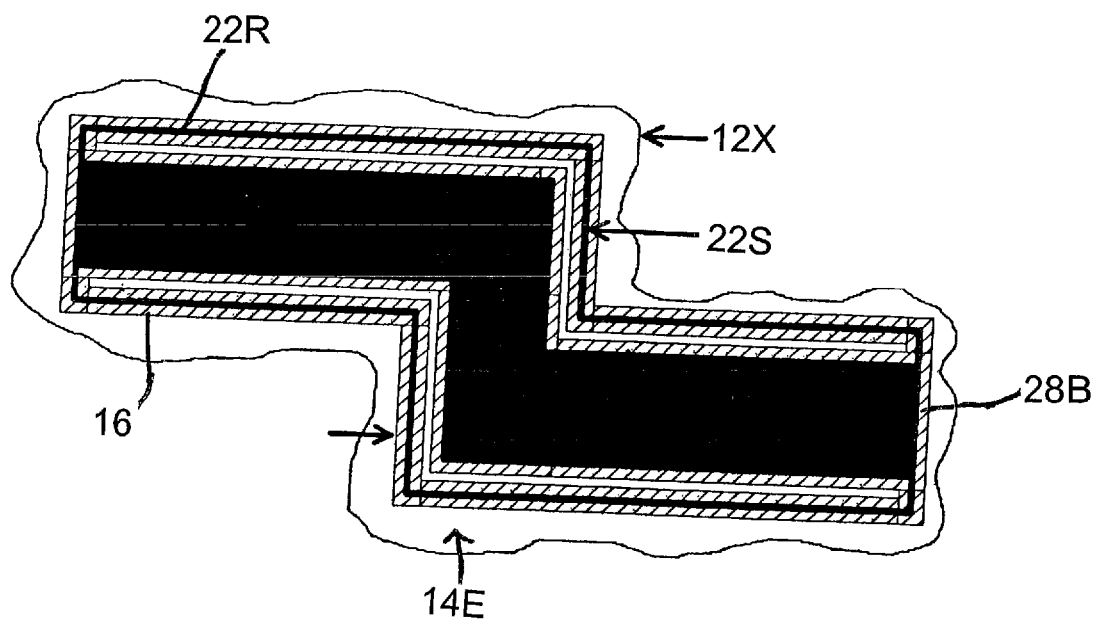
FIG. 2D is a diagrammatic top view of a current build layer showing a void through the composite model.

Referring now to FIG. 2D, formation of a different void within the final model 10 will now be described. According to this embodiment, the build layer 12X includes a void 28B running or extending through the length of the composite model 10CD where at least the model material 14 comprising a removal area, channel or region 22R of the layer 12X in the area of the void 28B at the top of the void 28B is removed, thus forming the top surface of the void 28B. This removal area, channel or region 22R is indicated by the dark area of the build layer 12X, in FIG. 2D, and comprises a region of build layer 12X within the composite model perimeter defined by the inner surface 24 of the composite model 10C in this region. As in the case of the void 28A and the build layer 12V discussed above, this removal area, channel or region 22R is then subsequently filled with the sacrificial material 16 to create the sacrificial material inlay area 22S and comprises a region of the encapsulating shell 20 at the bottom of the void 28B, thereby creating a supporting surface upon which the next vertically higher layer is fabricated on during the fabrication process.

Figure 2E:
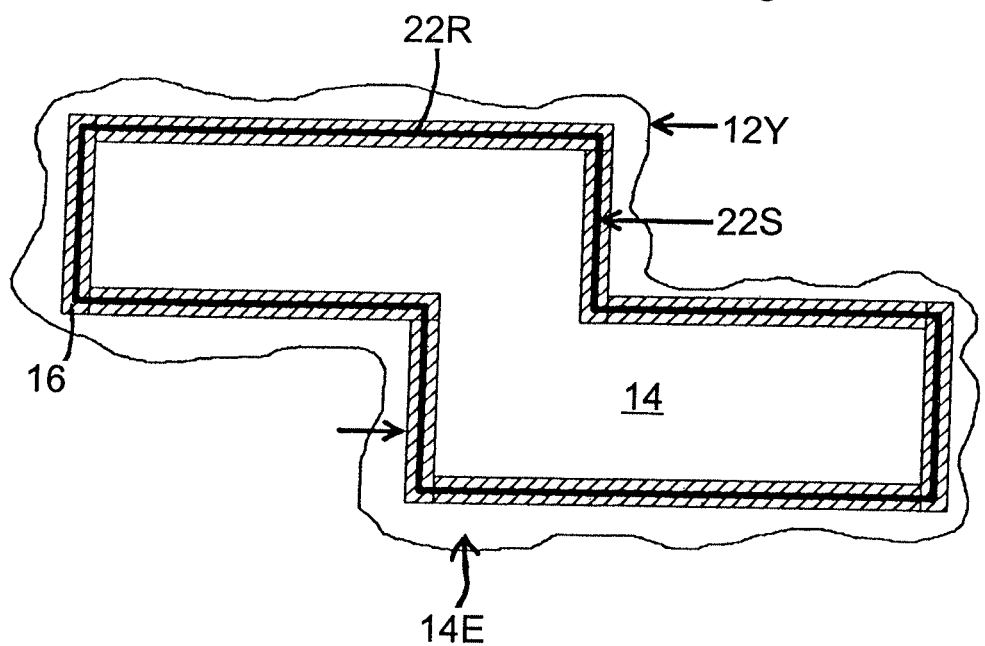
FIG. 2E is a diagrammatic top view of the penultimate build layer of the composite model.

Lastly now referring to FIG. 2E, formation of a further type of void within the final model 10 will now be described. According to this embodiment, the build layer 12Y of the model 10 essentially does not contain any features, and essentially comprises build layers 12Y of the model material 14 having outside extent bounded by the perimeter surface 24 of the build layers 12Y. As such, the model material 14 of the build layer 12Y remains intact with the exception of the removal area 22R trench which excavated along the inside and the outside perimeter surfaces 24 of the composite model 10C, which is subsequently filled with the sacrificial material 16 to form the sacrificial material inlay area 22S comprising portions of the encapsulating shell 22 which encloses the model 10.

Figure 2F:
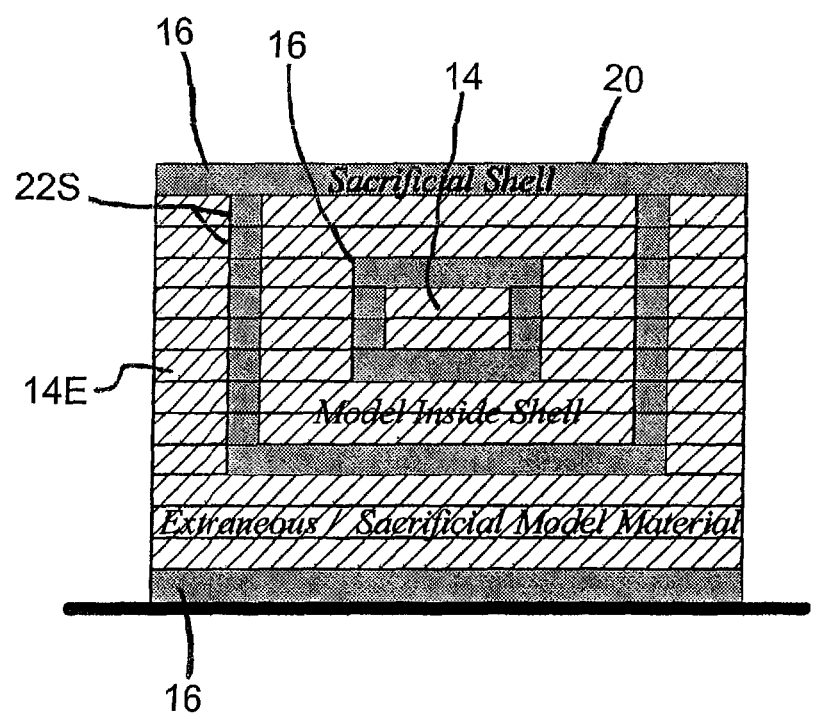
FIG. 2F is a diagrammatic cross sectional view of the composite model taken along section line 2F-2F of FIG. 2A.
Figure 2H:
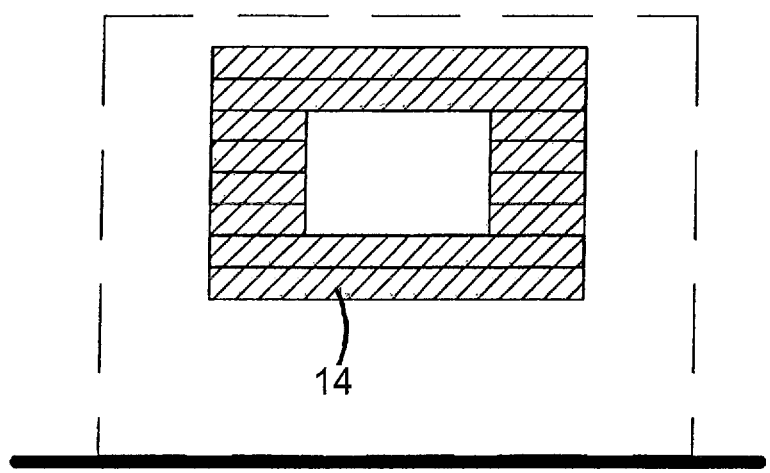
FIG. 2H is a diagrammatic cross sectional view of the composite model, taken along section line 2F-2F of FIG. 2A, following removal of the sacrificial material.

Now referring to FIGS. 2F and 2G, and as described above, the result of the above described model fabrication method is a laminated, composite structure 10C that comprises the build layers fabricated from the model material 14 and the sacrificial material 16 that are adhered to one another and are typically sandwiched between one or more foundation layers 12F and possibly one or more terminal layers 12T. As illustrated in FIG. 2G, the laminated structure of the composite model 10C contains the final model 10, generally at its core, and comprises exclusively of the model material 14 embedded inside a protective exterior shell 20 that generally comprises exclusively the sacrificial material 16. As also illustrated in FIG. 2G, the sacrificial shell 20 may be at least partially embedded in an outer covering comprising extraneous model material 14E that is located outside of the outermost removal areas 22R from which the model material 14 was removed during the fabrication process of each layer 12.

According to the present invention, and in those instances where the model 10 is encapsulated in the encapsulating shell 20 of the sacrificial material 16 which is at least partially enclosed within one or more bodies of the extraneous model material 14E, as in the exemplary composite model 10C shown in FIGS. 2F and 2G, a two step removal process is generally utilized to extract the final model 10 from the composite model 10C. During the model extraction process, the first step 18I generally comprises removal of the extraneous model material 14E that was deposited and located outside of the protective shell 20, either to provide support for subsequent layers 12 or simply as excess deposited material. The extraneous model material 14E that either surrounds and/or encloses the encapsulating shell 20 of the sacrificial material 16 is removed by using a process that does not affect the sacrificial material 16, such as a chemical solvent that only dissolves the model material 14, that is, the extraneous model material 14E, but does not affect or dissolve the sacrificial material 16. Other possible processes for removing extraneous model material 14E, without affecting sacrificial material 16, may include, for example, mechanical means or mechanisms, such as a machining or a routing process. The resulting removal of the extraneous model material 14E from a composite model 10C is generally diagrammatically shown in FIG. 2H, which is a diagrammatic cross section of the composite model 10C from which the extraneous model material 14E was removed.

The second step 18J of model extraction process is the removal of the encapsulating shell 20 of the sacrificial material 16 and this typically employs a process that only affects the sacrificial material 16, but does not affect the model material 14. Examples of such processes for the removal of the sacrificial material 16 include a chemical solvent that dissolves the sacrificial material 16 but does not dissolve or otherwise affect the model material 14 or the use of a sacrificial material 16 which has a lower melting point or temperature than the melting point or temperature of the model material 14. The result of the removal of the encapsulating shell 20 of the sacrificial material 16 from the composite model 10C is shown in FIG. 2I, which is cross section of the composite model 10C following removal of the sacrificial material.

C. Further Embodiments of the Invention

1. Reinforcement of the Sacrificial Material by the Model Material in Layers

As described above, and according to the present invention, the build layers 12M, 12U, 12V, 12W, 12X, 12Y of the composite model 10C typically comprise of the sacrificial material 16, as in foundation layers 12F and the terminal layers 12T, or more rarely only the model material 14, or more typically primarily the model material 14 with relatively small inlays 22S comprising the sacrificial material 16 defining the surfaces 24 of the final model 10. In certain instances, however, the structure and features of the final model 10 are such that one or more layers 12 may include one or more areas comprising large inlays 22S, such as in the case of the build layer 12V of the exemplary model 10 discussed above with reference to FIG. 2B. In other instances, and perhaps more commonly, the model 10 structure and features may be such that the first or the first few build layers 12M of the composite model 10C, that is, the lower most build layer or layers 12M of the model 10, or the upper most build layer or layers 12M of the model 10, adjacent the terminal layer or layers 12T, may include one more large voids 28 starting at the first build layer 12M of the model 10, so that the first layers 12M of the model 10 include relatively small areas of the model material 14 and would thus include relatively large areas of the sacrificial material 16. An example of such design is shown, for example, in FIG. 2B where the void 28A extends downward to the lowest build layer 12M of the composite model 10C.

The build layers 12 of the composite model 10C constructed entirely or primarily or in large areas from the sacrificial material 16 may, however, result in a relatively large, thin and possibly unsupported layer 12, particularly following removal of the extraneous model material 14E from the final composite model 10C structure, resulting in a build layer 12 that is relatively weak, unsupported and subject to damage from handling during the removal of the extraneous model material 14E and the sacrificial material 16. While damage to the foundation layer 12F or the terminal layer 12T is often in itself inconsequential, it is to be appreciated that the damage can extend into the critical areas of the encapsulating shell 20 adjacent to model features and possibly compromise the integrity of the encapsulating shell 20.

Figure 3A:
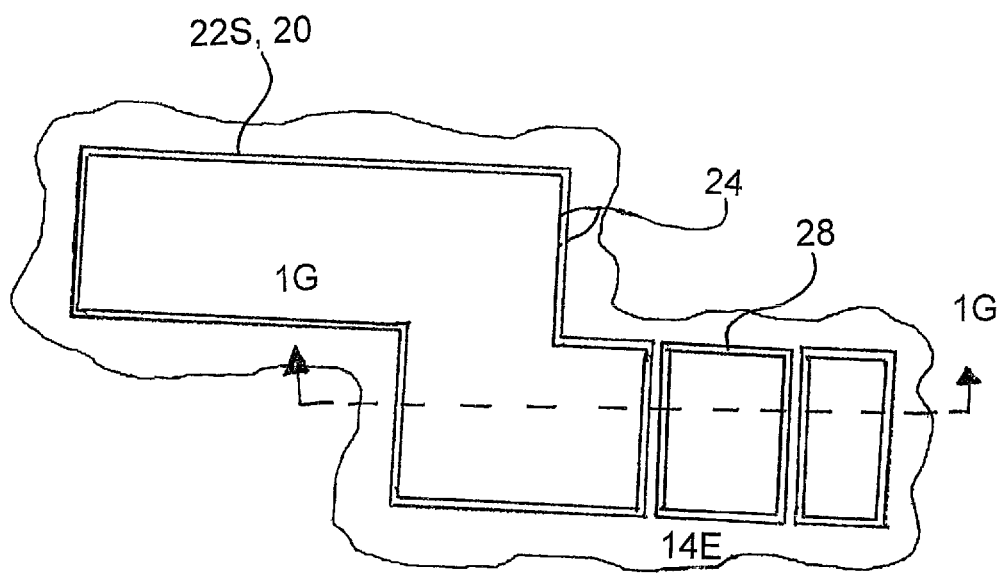
FIG. 3A is a diagrammatic top plan view of a build layer of the composite model showing a different technique for a void.

In such instances, and as illustrated in FIG. 3A for the case of the foundation layer 12F adjacent the void 28 such as illustrated in FIG. 2B, the layer 12 in question may be fabricated using both the model material 14 and the sacrificial material 16, rather than exclusively or primarily from the sacrificial material 16. In such cases, the deposition of the sacrificial material 16, that is, the areas occupied by the sacrificial material inlays 22S, is generally limited to those areas adjacent to the features of the final model in the build layer 12M. That is, to those areas adjacent to surfaces 24 which will form the final model 10 and possibly to surrounding areas of the extraneous model material 14E, and the model material 14 remains in the remainder of the build layer 12 areas, e.g., it is not removed from the build layer 12M. This method typically provides a stronger support layer as well as a more reliable separation between the sacrificial material 16 and the model material 14 of that build layer 12M and in the adjacent layers 12 and provides better protection to the encapsulating shell 20 which either forms the final composite model 10C or encloses and protects the composite model 10C. Depositing one or more smaller regions of the sacrificial material 16 in the layer 12 in question, but only adjacent to the model features in the build layer, while leaving a balance of the build layer 12M unaffected reduces the risk of unintended damage to the encapsulating shell 20 by eliminating thin unsupported portions of the encapsulating shell 20 and facilitates faster completion of the build layer 12M.

2. Fabrication of Reentrant Angles

Figure 3B:
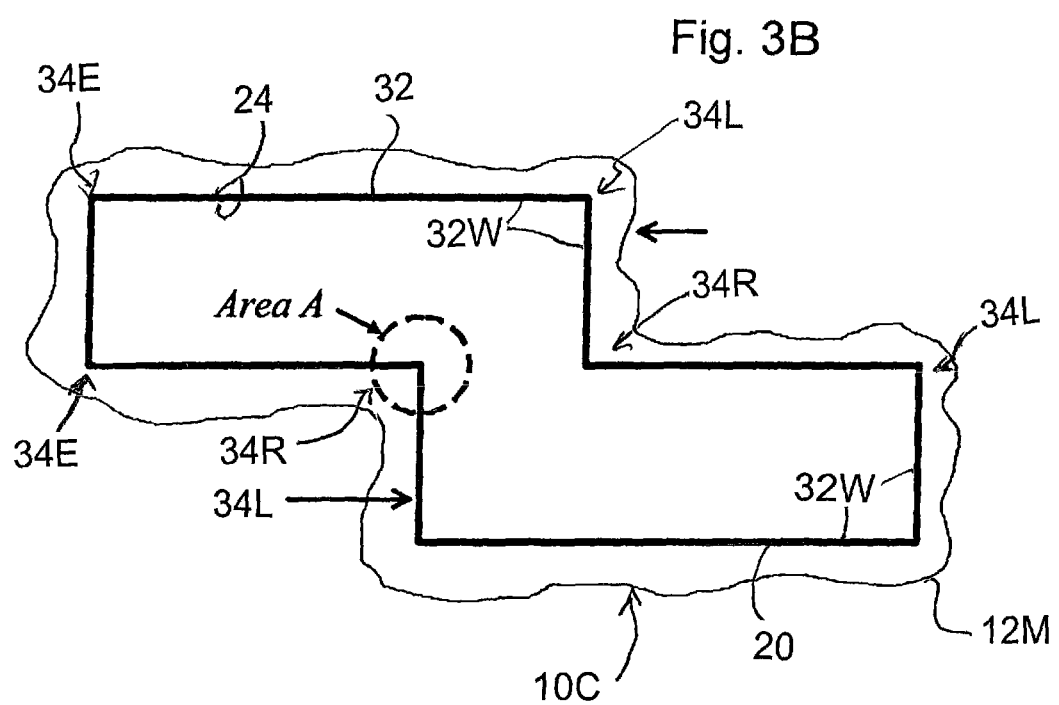
FIG. 3B is a diagrammatic top plan of a build layer of the composite model with intersecting wall segments which form exterior reentrant angles and interior reentrant angles.

The surfaces 24 of the composite model 10C may commonly include one or more reentrant angles, also referred to as interior angles, which are often defined as the intersection or two lines or surfaces having faces exterior to at least a local region of the model and that intersect at an angle of 180° or less. An example of such a reentrant angle is illustrated in FIG. 3B for the build layer 12M of the composite model 10C having the form, on at least that build layer, of a wall 32 comprising multiple segments 32W. As shown, each intersection of two wall segments forms a local region 34L of the composite model 10C having an exterior angle 34E (e.g., reentrant angles 34R) that is equal to or greater than 180° and an interior reentrant angle 34R of 180° or less (e.g., reentrant angles 34R).

Reentrant angles 34R in the surfaces 24 of the composite model 10C are a recurring problem in systems where the features of the composite model 10C, that is, the surfaces 24 of the model 10, are defined or formed by the machining processes because the tools by which such surfaces are defined or formed, such as milling devices, are typically not capable of forming such acute interior angles. That is, machining tools such as milling devices, typically comprise a cylindrical rotating, cutting or grinding heads, tips or surfaces having at least a small but defined cutting or grinding radius. As a result of such design, as more specifically illustrated in FIG. 3C, such machining tools typically leave a curved fillet 36 in the reentrant angle 34R formed by the intersection of two intersecting surfaces 24 of the composite model 10C. Such fillets 36 are generally equal in size to the radius of the milling device or other machining tool. While it is possible to use a smaller radius tool and thereby produce a smaller fillet 36, the use of a smaller machining tool is time consuming and still does not, and cannot, completely eliminate the fillets 36 but merely reduces the radius of curvature of the fillet(s) 36. A smaller machining tool size also introduces a tradeoff between the fillet 36 size and the number of machining passes that are required to remove the desired model material 14 along and adjacent to the external model surfaces 24.

While it is possible to reduce the net effects of this tradeoff by using more than one machining tool diameter, the use of multiple machining tools, including multiple or changeable tools, adversely affects both the time, cost and reliability of the system for fabricating composite models 10C. Consequently, while using one or more machining tools may be viable in some implementations and applications, it is generally not acceptable for high precision model fabrication or applications where minimizing fabrication time is important.

A further embodiment and implementation of the present invention, however, permits the fabrication of reentrant angles 34R formed by the intersection of two mating surfaces 24 of the composite model 10C without formation of any fillets 36 by a reentrant angle fabrication process 18D' which is preformed immediately prior to fabrication of any build layer 12M that includes at least one reentrant angle 34R in at least one surface 24 of the composite model 10C. The reentrant angle fabrication process 18D' first includes a fillet material deposition step which is executed prior to the model material deposition step 18D, illustrated herein above in FIG. 1E, for example.

Figure 3D:
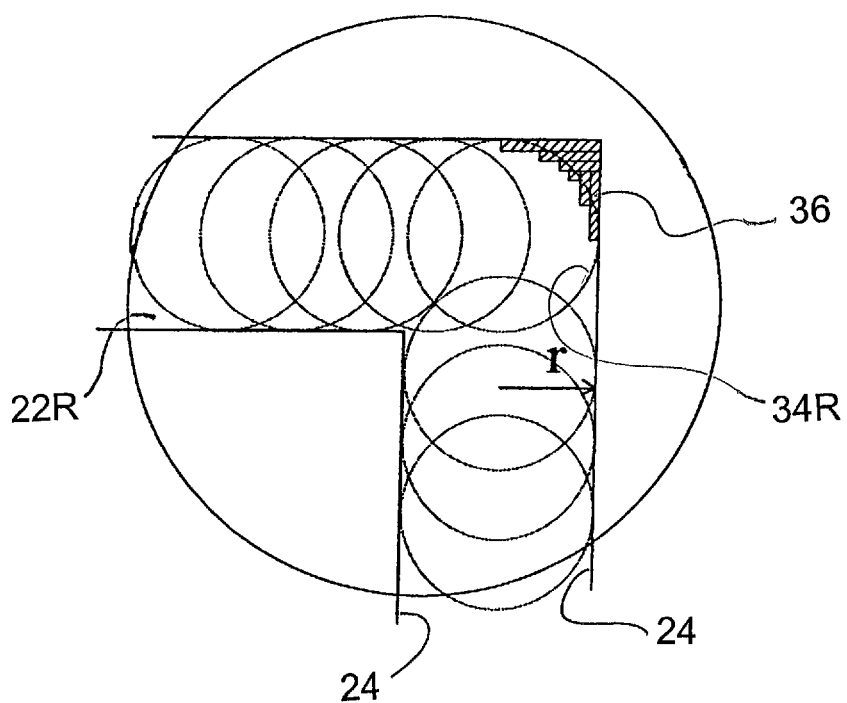
FIG. 3D is an enlarged, diagrammatic top plan view of area A of FIG. 3B showing deposition of the reentrant (sacrificial) material, along the interior region of the interior reentrant angle, prior to deposition of the build layer.

According to the present invention, and as illustrated in FIG. 3D, the material deposition step of the reentrant angle fabrication process 18D' includes the initial deposition of a reentrant sacrificial material 16R, at the precise locations to at least fill the fillet space 36S with a desired reentrant angle filler 34F, e.g., a shell material such as a reentrant sacrificial material 16R. As illustrated in FIG. 3D, the two mating and intersecting sides each of the reentrant angle filler 34F precisely conform to and define a portion of the exterior intersecting surfaces 24 of the composite model 10C of the reentrant angle 34R and, on a third side, at least fills the space which would be occupied by the fillet 36 if the angle had been shaped by a machining process rather than by the reentrant angle fabrication process 18D'. The reentrant angle filler 34F is deposited so as to have a sufficient a thickness that, as in the case of the subsequent deposition of the model material 14 and then the sacrificial material 16, to complete formation of the sacrificial material inlay areas 22. That is, the reentrant angle filler 34F has a height at least equal to or preferably greater than the intended final thickness of the build layer 12M.

According to the present invention, the reentrant sacrificial material 16R may comprise the same sacrificial material 16 that comprises the sacrificial material inlay areas 22S and the encapsulating shell 20, or may be comprise a different sacrificial material 16R that is removable by a process that does not affect the sacrificial material 16 and/or the model material 14 and that is not affected by the processes used to remove the sacrificial material 16 or the extraneous model material 14E.

It will also be noted that reentrant sacrificial material 16R must comprise a material, and must be deposited by a process, that allows the deposition of the reentrant sacrificial material 16R with the precision and within necessary tolerances that satisfy the dimensional requirements required to define and construct the surfaces 24 and the reentrant angle 34R. In general, these requirements may be met, for example, by the use of a drop-on-demand inkjet printing mechanism or other similar or equivalent mechanism and deposition process or technique. Following deposition of the reentrant sacrificial material 16R, then the build layer 12M, e.g., the model material 14 as also illustrated in FIG. 1E, is then deposited on top of the deposited reentrant sacrificial material 16R and selected areas are then removed as discussed above, by steps 18D to 18G. It is to be appreciated that if the exterior surface of the shell 20 is to define the exterior surface of the composite model 10C, then the reentrant angle 34R of interest will be the exterior angles 34E (e.g., outwardly facing reentrant angles 34R) instead of the inwardly facing the reentrant angles 34R.

The process of the present invention, for constructing sequential build layers 12 is continued, on a layer-by-layer basis, until completion of the entire composite model 10C, including the deposition of reentrant sacrificial material 16R, the deposition and machining of the build (e.g., model) material 12M, the deposition of the shell (e.g., sacrificial) material and the planing of the deposited materials, as necessary, to complete construction of the composite model 10C.

In this regard, it will be noted that when the model material 14 is deposited onto any build layer 12M having one or more exterior angles or interior angles, i.e., reentrant angles 34R, that are either greater than or equal to 180° or less than or equal to 180°. The interior or the exterior "fillets" 36, formed of the reentrant sacrificial material 16R in each reentrant angle 36R, will comprise a mold to form the model material 14 being deposited into corresponding surfaces 24 having the shape and dimensions of the reentrant angles 36R.

Subsequently, when each build layer 12 is then machined to remove the model material 14 from the removal areas 22R in preparation for the deposition of the sacrificial material 16 to form the sacrificial material inlay areas 22S, the machining process possibly may remove a small portion of the interior or the exterior fillets 36 but will generally leave a majority of the fillets 36 unaffected, e.g., the interior fillet 36 as shown in FIG. 3C.

As described above, the reentrant angle fabrication process further includes a subsequent material removal step executed in association with the extraneous model material 14E and/or the sacrificial material 16 removal steps 18I and/or 18J, In brief, the reentrant sacrificial material 16R is removed by the corresponding process appropriate for the reentrant sacrificial material 16R while the extraneous model material 14E and the sacrificial material 16 are removed by the processes appropriate for removal of those materials. The sequence in which the various materials are removed remains generally as described above except that the reentrant sacrificial material 16R is removed at a point in the material removal process that is dependent upon the disposition of the materials in the composite model 10C. In general, the interior reentrant sacrificial material 16R will be enclosed within the sacrificial material 16, at least parts of which may be enclosed within extraneous model material 14E, if any, and as such would be removed after removal of the extraneous model material 14E and either with the sacrificial material 16 of possibly after removal of the sacrificial material 16, though another separate removal process is less desirable. Any exterior reentrant sacrificial material 16R will be generally exposed along with the sacrificial material 16 and as such can be removed along with the sacrificial material 16, after removal of the extraneous model material 14E. Alternatively, the exterior reentrant sacrificial material 16R will be generally exposed along with the sacrificial material 16 and thereby define a portion of the outer surface of the shell 20, which defines the outer surface of the composite model 10C, in the event that the shell 20 is to be retained and define the outer surface of the composite model 10C.

Lastly, it will be recognized by those of ordinary skill in the relevant art that the reentrant angle fabrication process of the present invention, as described above, may also be employed to form and fabricate model features and details that are too fine or too close to be formed using conventional machining methods.

3. Fabrication of a Model Using Non-Horizontal Layers

The above descriptions of the fabrication of the composite model 10 assume that the foundation layer 12F and thus all subsequent build layers 12M of the composite model 10C are fabricated on and parallel to a base plate or other support surface or table T, 40W, as described below, which is in turn parallel to a reference base plane which will typically be horizontal. For convenience and the purposes of the following descriptions, the build layers 12 of the composite model fabricated in this manner and the corresponding reference base plane will be referred to as "horizontal" build layers 12 and a "horizontal" reference base plane.

In certain circumstances, however, the fabrication of a composite model 10C by horizontal build layers 12 formed on a horizontal base plane may be disadvantageous. For example, the design of a given model 10 may require the deposition of large amounts of the build (e.g., model) material 14 or sacrificial (e.g., sacrificial) material 16 by selective processes, which as discussed above are more time consuming than by non-selective processes, or the removal of large amounts of model material 14 or sacrificial material 16, which is again time consuming, either of which may result in an increase in fabrication time and costs. In other instances, the composite model 10C may contain one or more surfaces which are at an angle to at least the horizontal base plane and possibly to other surfaces of the composite model 10C and in certain instances, in particular, the "slanted" surfaces may comprise more area than do the "horizontal" surfaces of the composite model 10C.

In such instances, and according to the present invention, the base plane upon which the composite model 10C is formed, that is, the base plate or support surface of the fabrication system in which the composite model 10C is created, may be tilted with respect to the horizontal reference plane to be parallel with, for example, the slanted surfaces of the composite model 10C and the layers 12 formed with a tilted base plane will thereby be effectively "horizontal" with respect to each other and will accordingly be at an angle other than 90 degrees with respect to, for example, the vertical surfaces of the composite model 10C. It must be noted that any horizontal or vertical surfaces of the composite model 10C which were originally parallel to or vertical to the original horizontal base plane will now be at an angle with respect to the tilted base plane, so that surfaces running across the slant of the tilted base plane will now appear as lines across successive builds layers 12 of the composite model 10C. In a like manner, vertical surfaces running along the tilted base plane will appear on successive tilted build layers 12 as points, short lines, small surfaces, etc. In any event, what was originally a relatively large surface(s) or line(s) of the composite model 10C when the build layers 12M were formed parallel to a horizontal base plane will be reduced to relative short segments of lines or surfaces, thereby potentially significantly reducing the amount of selective material deposition or removal in the build layers 12M for each build layer.

D. An Exemplary System for the Fabrication of Models

An apparatus for performing certain of the basic processes for fabricating composite three dimensional models are illustrated in, for example, U.S. Pat. No. 7,700,016 issued to Wigand et al. on Apr. 20, 2010 for a Method And Apparatus For Fabricating Three Dimensional Models and U.S. Pat. No. 7,993,123 issued to Wigand et al. on Aug. 9, 2011, also titled Method And Apparatus For Fabricating Three Dimensional Models, both of which are incorporated herein by reference. The following will describe an improved version of the apparatus described in U.S. Pat. Nos. 7,700,016 and 7,993,123, wherein the improved apparatus includes the capability of performing, in particular, the processes described herein. The improved apparatus described herein below will also include methods and mechanisms of the present invention for the establishment, monitoring and control of the positions, orientations and positional and orientational tolerances of and between the elements of an apparatus for fabricating three dimensional models from successive layers of model and sacrificial materials, including establishing, monitoring and controlling the thicknesses, rates of deposition and edge orientations and tolerances of the deposited materials.

Figure 4A:
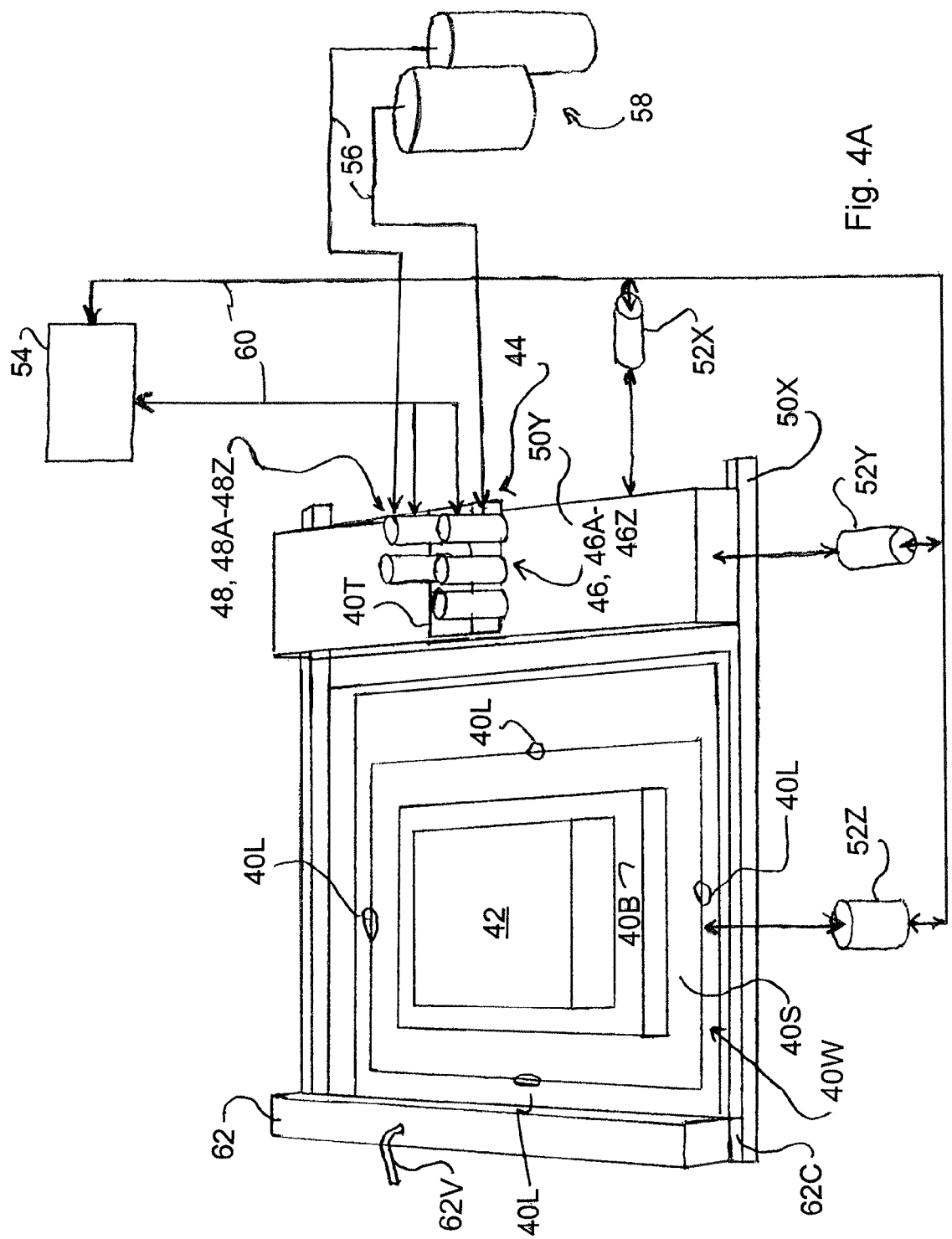
FIGS. 4A-4C are diagrammatic representations of a system for fabrication of the three dimensional composite model according to the present invention.
Figure 4B:
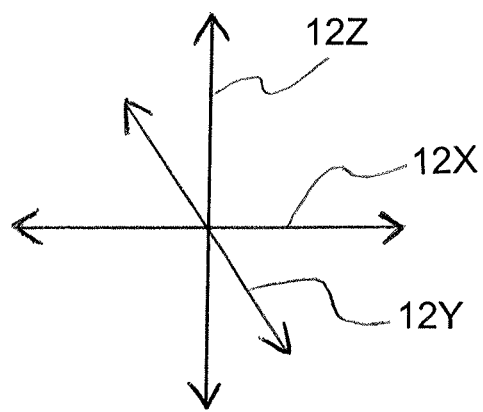
Figure 4C:
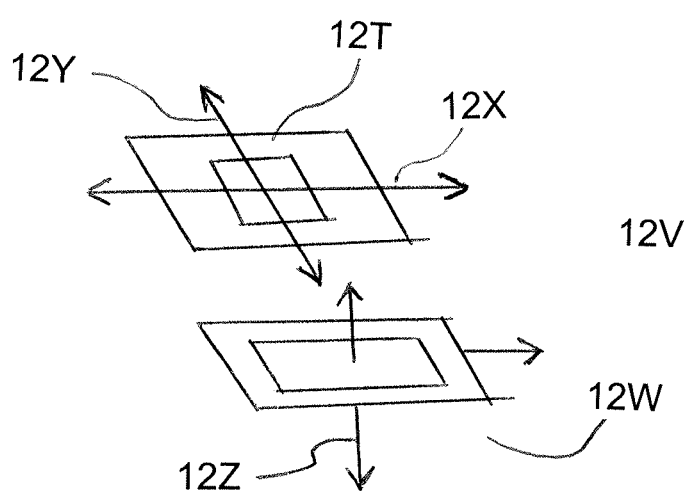

Referring now to FIGS. 4A-4C, isometric and diagrammatic views of a three dimensional model fabrication system 38 incorporating the present invention are shown. As shown therein, the fabrication system 38 includes a vertically positional workpiece platform 40W for supporting a composite model 42 being fabricated and a tool platform 40T that is supported above workpiece platform 40W and supports a plurality of fabrication tools 44, such as material deposition devices 46, such as material deposition devices 46A, 46B . . . 46Z and one or more milling tools 48, such as milling tools 48A, 48B . . . 48Z. It must be recognized and understood with regard to the following descriptions of the present invention that the number and locations of material deposition devices 46 and/or milling tools 48 on or in a tool platform 40T may, in any given embodiment of the present invention, vary significantly from that shown in FIG. 4A-4C while remaining within the spirit and scope of the present invention.

Workpiece platform 40W is vertically positional along a vertical Z axis 40Z with respect to a generally horizontal tool plane 40XY while tool platform 40T is supported vertically above workpiece platform 40W along the tool plane 40XY. In a presently preferred embodiment, the tool platform 40T is supported on and is positional along a y-axis rail 50Y that extends along a horizontal y-axis 40Y in tool plane 40XY. The opposing ends of y-axis rail 46Y are, in turn, supported upon and are positional along a pair of corresponding generally horizontal x-axis rails 50X that are located on opposite sides of workpiece platform 40W and that extend parallel to a horizontal x-axis 40X in the tool plane 40XY that is orthogonal to y-axis 40Y in the tool plane 40XY.

Tool platform 40T, with fabrication tools 44, is thereby positional anywhere within the tool plane 40XY, which is typically parallel to the composite model 42 and, in particular, the currently top most layer of the composite model 42, which is, in turn, vertically positional along Z axis 40Z with respect to tool plane 40XY. It should be noted, however, that while the layers of the composite model 42 are parallel to tool plane 40XY as a consequence of each successive layer being deposited and shaped by tools 44 mounted on tool platform 40T and thereby restrained to tool plane 40XY, the plane of workpiece platform 40W is not necessarily parallel with tool plane 40XY. As will be discussed below, and while the orientation of the plane of workpiece platform 40W is controllable with respect to the tool plane 40T, there may be circumstances in which it is advantageous to angularly offset the orientation of the plane of the workpiece platform 40W with respect to the tool platform 40W.

According to one embodiment of the fabrication system 38, and as illustrated in FIGS. 4A-4C, the workpiece platform 40W may be designed and adapted to receive and secure a workpiece support plate 40S, which comprises, for example, a metal plate engaging into an opening or recess in workpiece platform 40W and retained therein by workpiece support platform latches 40L with the upper surface of workpiece support plate 40S being positioned generally parallel to and offset from the tool plane 40XY. A replaceable workpiece base 40B comprise, for example, a relatively dense and typically non-porous or closed cell foam or plastic material which has a relative smooth, typically non-absorbent, upper surface may, in turn, be removably mounted upon workpiece support plate 40S, with the composite model 42 being fabricated on the upper surface of the workpiece base 40B.

It will be seen, therefore, that workpiece base 40B and workpiece support plate 40S perform a number of functions, such as providing a mechanism or means for handling a finished composite model 42 without damage to the composite model 42, such as in removing the composite model 42 from the fabrication system 38 for subsequent processing, such as removal of the extraneous model material and the shell material. In addition, the workpiece base 40B provides an offset between the tool platform 40T, the fabrication tools 44 and a planing device 62, described below, and the workpiece platform 40W, thereby preventing an inadvertent interaction and wear or damage between, for example, the fabrication tools 44 or the planing device 62 and the workpiece platform 40W. The material of a workpiece base 40B may also provide a preferred surface for the mounting and removal of the composite model 42, and may provide a surface that can be readily planed, such as by the planing device 62 described below, so as to be precisely parallel with the tool plane 40XY. A workpiece base 40B also provides a readily and cheaply disposable mechanism for protecting the workpiece platform 40W and the workpiece support plate 40S from wear and contamination and from the accumulation of, for example, sacrificial and/or model material during the fabrication processes.

As indicated in FIGS. 4A-4C, the vertical position of the workpiece platform 40T with respect to the tool plane 40XY and thereby with respect to the fabrication tools 44 is adjustable and controlled by a Z axis actuator 52Z while the horizontal position of the tool platform 40T along y-axis 40Y and x-axis 40X of the tool plane 40XY are respectively controlled by a y-axis actuator 52Y and an x-axis actuator 52X. It will also be appreciated that there are a variety of Z axis actuator 52Z, y-axis actuator 62Y and x-axis actuator 52X which are designed and capable of meeting these requirements, such as rotationally driven screw shafts with or without carriage guidance tracks, rack and pinion mechanisms, belts and pulleys, etc., all of which are well known to those of ordinary skill in the art and may be employed in place of the exemplary designs described herein. As such, Z axis actors 52Z, the y-axis actuators 52Y and the x-axis actuators 5X need not be described in further detail herein and are accordingly represented in FIGS. 4A-4C and in following figures in diagrammatic form rather than by detailed exemplary examples of the actuators.

Referring therefore to the requirements and functions of the Z axis actuators 52Z, the y-axis actuators 52Y and the x-axis actuators 52X, it will be recognized that the Z axis actuator 52Z is required to both support and move the workpiece platform 40W along the Z axis 40Z with a high degree of precision and repeatability and to maintain the orientation of the plane of workpiece platform 40W with respect to the tool plane XY at all positions along the Z axis 40Z and under varying loads placed on workpiece platform 40W, some of which may be off center with respect to the workpiece platform 40W. Because of these requirements, and for example, the Z axis actuator 52Z may comprise a rotationally driven vertically oriented screw shaft coupled to, for example, a bottom edge region of the workpiece platform 40W with the workpiece platform 40W being restrained in the horizontal orientation by multi-point roller bearings mounted onto the workpiece platform 40W and engaging with corresponding vertically oriented bearing tracks located along opposing sides of the workpiece platform 40W.

It will also be recognized that the requirements of and thus the designs for the y-axis actuator 52Y and the x-axis actuator 52X may be different from those of the Z actuator 52Z because, for example, the tool platform 40T is supported by the horizontally oriented y-axis rail 50Y and the y-axis rail 50Y is, in turn, supported by the horizontally oriented x-axis rails 50X while the workpiece platform 40W is supported during vertical movement and positioning. As such, the y-axis actuator 52Y and the x-axis actuator 52X may comprise, for example, rotationally driven horizontally oriented screw shafts or rack and pinion mechanisms, belts and pulleys, etc., and may include or incorporate any of a variety of position sensors and indicators, a wide variety of which will be well known to those of ordinary skill in the relevant art.

It must also be recognized that in other embodiments of the fabrication system workpiece platform 40W may be horizontally and vertically fixed and the tool platform 40T may be vertically and well as horizontally positional. The modifications to the tool platform 40T to provide vertical as well as horizontal positioning of tool platform 40T will, however, be well understood by those of ordinary skill in the relevant art and may comprise, for example, supporting the x-axis rails 50X on a vertically positional support, possibly similar to that used for the workpiece platform 40W in the embodiment described herein above.

Referring again with reference to the tool platform 40T, it will be noted that the tool platform 40T is illustrated in FIGS. 4A-4C as supporting two material deposition devices 46, indicated as material deposition devices 46A and 46B, which, in a typical embodiment will comprise at least one drop-by-drop material deposition device 46 and typically at least two high deposition rate device 46, such as spray devices. Such fabrication system 38, as described herein above, is has the capability of fabricating reentrant surface angles without fillets 36. It is to be understood, however, that the tool platform 44P may include more or less deposition devices 46. It must also be understood that not only may the number of material deposition devices 46 vary, from embodiments of the fabrication systems 38 and the tool platforms 40T, but that the combinations of material deposition devices 46 may vary depending upon the requirements of the composite models 42 to be fabricated.

Where the fabrication system 38 has the capability of, for example, performing the "trench and fill" method for delineating model surfaces, the tool platform 40T will further include and support at least one milling tool 48, as described herein above, but may include two or more milling tools 48A, 48B . . . 48Z to allow, for example, both fast, rough-out milling and finer precision milling or to otherwise accommodate a variety of different milling tool types and sizes. In addition, the milling tools 48 may be constructed as individual milling tools or as one or more milling tools, each of which may have two or more milling heads. In either case, the milling tool 48 or the milling head of a single milling tool 48 may be selected and engaged with a motor and/or engaged with the current build layer the current build layer 12M of the composite model 42 by, for example, an axial solenoid actuator. As in the case of material deposition devices 46, the number, type, combinations thereof and locations of the milling tools 48 on the tool platform 40T may vary between embodiments of fabrication systems 38 and the tool platforms 40T, and that the types and combinations of milling tools 48 may vary depending upon the requirements of the composite models 42 to be fabricated.

As described above, the fabrication tools 44, including material deposition devices 46 and the milling tools 48 together with other elements of the tool platform 40T described below, all being mounted on the tool platform 40T, are thereby jointly positional along the x-axis 40X, the y-axis 40Y and the z axis 40Z with respect to the workpiece platform 40W and the layers of the composite model 42 thereupon by means of the single actuator group which comprises the x-axis actuator 52X, the y-axis actuator 52Y and the Z actuator 52Z. It will also be apparent that, for each position taken by the tool platform 40T along the x-axis 40X, the y-axis 40Y and the z-axis 40Z, each of the fabrication tools 44 mounted on the tool platform 40T will have a different "target point", that is and for example, the point at which the corresponding material from the material deposition device 46 is deposited on the current top most layer of the composite model 42 or at which the tool bit of the corresponding milling tool engages with the current top most layer of the composite model 42. According to the present invention, the offsets along the x-axis 40X, y-axis 40Y and z-axis 40Z between a position of the tool platform 40T, or a selected reference point thereupon, and the current "target points" of each of the fabrication tools 44 or other elements mounted thereupon is accommodated and compensated for in the programming of a system controller 54 which controls all operations of the fabrication system 38, including the positioning of the workpiece platform 40W and the tool platform 40T and all operations of the fabrication tools 44 as well as other elements of the fabrication system 38, described herein.

Lastly with regard to the tool platform 40T, and as shown in FIGS. 4A-4C, each material deposition device 46 requires a material feed connection 56 to a corresponding material supply reservoir 58 where the material feed connection 56 is typically heated to insure flow of the material provided therethrough to the material deposition device 46, and a control and power connections 60 between the system controller 54 and the material deposition device 46 to communicate control and power signals between the system controller 54 and the material deposition device 46. The milling tool 48 will similarly require a control and power connection 60 to the system controller 54 to communicate power and control signals between the system controller 54 and the milling tool 48. Such connections and their functions are, however, well known and customary in the art and not discussed in further detail, including those for elements other than the fabrication tools 44 mounted on the tool platform 40T and which will require material, power or control connections.

As also shown, and as described herein above and in U.S. Pat. Nos. 7,700,016 and 7,993,123, the fabrication system 38 will further include the planing device 62 for removing a portion of a deposited layer of the sacrificial mold material and the model material to reduce the layer to a selected thickness to thereby establish the plane of the upper surface of the build layer and to expose the upper surfaces of the sacrificial material and the model material in preparation for the deposition of the next build or termination layer.

According to one embodiment of the fabrication system 38, and as illustrated in FIGS. 4A-4C, the planing device 62 is typically mounted a planing carriage 62C which, in turn, is mounted upon and moveable along the x-axis rails 50X. The planing device 62 comprises, for example, a helical rotary cutter having a horizontal axis of rotation orthogonal to the x-axis rails 50X to plane the currently upper most layer of a composite model 42 along a plane parallel to the tool platform plane 40XY. The fabrication system 38 will also typically include a vacuum connection 62V for extracting and disposing of any cut and removed material from the build layer of the composite model, such as that produced by the planing device 62, and possibly removing overspray material from material deposition devices 46A, 46B . . . 46C.

Since certain changes may be made in the above described process and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A method of fabricating a three dimensional model from a composite model formed by a plurality of layers with the composite model comprising at least one shell material encasing and enclosing a build material, the method comprising the steps of:
   (1) for each build layer, depositing a build layer of the build material onto a preceding layer;
   (2) mechanically removing a selected area of the build material from the deposited build layer by a mechanical process;
   (3) filling only the selected area of the removed build material with the shell material; and
   (4) reducing a thickness of the build layer to a desired final thickness to complete formation of the build layer for supporting a next subsequent build layer; and
   (5) repeatedly repeating steps (1) through (4) for each subsequent build layer until fabrication of the composite model is completed.

2. The method of fabricating the three dimensional model according to claim 1, further comprising the step of using a model material as the build material and using a sacrificial material as the shell material.

3. The method of fabricating the three dimensional model according to claim 1, further comprising the step of using a sacrificial material as the build material and using a model material as the shell material.

4. The method of fabricating the three dimensional model according to claim 1, further comprising at least one initial step of:
   (A) depositing at least one layer of a foundation material for forming a foundation layer to support a bottom most first build layer of the composite model, and
   (B) reducing the foundation layer to a desired final thickness for supporting the bottom most first build layer of the composite model.

5. The method of fabricating the three dimensional model according to claim 1, further comprising at least one initial step of:
   (A) depositing at least one layer of a foundation material for forming a foundation layer to support a bottom most first build layer of the composite model,
   (B) reducing the foundation layer to a desired final thickness for supporting the bottom most first build layer of the composite model; and
   repeating steps (A) and (B) a plurality of times to form a foundation for supporting the bottom most first build layer of the composite model.

6. The method of fabricating the three dimensional model according to claim 1, further comprising at least one final model completion step of:
   depositing at least one layer of the shell material to form a termination layer of the composite model and enclose the final layer of the composite model.

7. The method of fabricating the three dimensional model according to claim 4, further comprising the step of, following completion of the composite model, removing extraneous build material from the composite model thereby leave a shell which defines an exterior surface of the three dimensional model.

8. The method of fabricating the three dimensional model according to claim 4, further comprising the step of, following completion of the composite model, removing both extraneous build material from the composite model and the shell thereby leaving a core build material which defines an exterior surface of the final model.

9. The method of fabricating the three dimensional model according to claim 1, further comprising the step of depositing each of the build material and the shell material by one of a selective deposition process and a non-selective deposition process.

10. The method of fabricating the three dimensional model according to claim 1, further comprising the step of mechanically removing the build material from the build layer by one of a mechanical machining process, a laser cutting process and a routering process.

11. The method of fabricating the three dimensional model according to claim 1, comprising the step of deposition a bottom most layer of the build material so that the bottom most layer has an area at least as greater as an area for each subsequent build layers of the composite model to thereby provide support for the composite model.

12. The method of fabricating the three dimensional model according to claim 10, further comprising the step of removing the build material, in each removal area, to a depth extending from a top of a current build layer to a top of a next immediately adjacent preceding build layer.

13. The method of fabricating the three dimensional model according to claim 1, further comprising the step of forming at least one area of a build layer without any build material being removed from the build layer.

14. The method of fabricating the three dimensional model according to claim 4, further comprising the step of forming at least one transition layer between the foundation layer and the build layer without any build material removed from the transition layer.

15. A method of fabricating a three dimensional model from a composite model formed be a plurality of layers with the composite model comprising at least one shell material encasing and enclosing a build material, the method comprising the steps of:
  (1) depositing a build layer of the build material onto a preceding layer;
  (2) removing a selected area of only the build material from the deposited build layer;
  (3) filling the selected area of the removed build material with the shell material;
  (4) reducing a thickness of the build layer to a desired final thickness to complete formation of the build layer for supporting a next subsequent build layer
  (5) repeatedly repeating steps (1) through (4) for each subsequent build layer until fabrication of the composite model is completed; and including formation of at least one reentrant angle for a build layer comprising the steps of:
  depositing a fillet of reentrant shell material for each reentrant angle wherein each fillet of reentrant shell material conforms to and defines a portion of the shell at least partially fills a space which would be otherwise be occupied by a fillet shaped by a machining process, prior to deposition of the build material in step (1).

16. The method of fabricating the three dimensional model according to claim 15, further comprising the step of using a sacrificial material as the reentrant shell material.

17. The method of fabricating the three dimensional model according to claim 15, further comprising the step of using a model material as the reentrant shell material.

18. The method of fabricating the three dimensional model according to claim 15, further comprising the step of removing the reentrant shell material by a process which affects the shell material but without affecting the build material.

19. The method of fabricating the three dimensional model according to claim 16, further comprising the step of depositing the reentrant shell material by a drop-on-demand process.

20. A method of fabricating a three dimensional model from a composite model formed by a plurality of layers with the composite model comprising at least one first material encasing and enclosing a second material, the method comprising the steps of:
  (1) depositing at least one layer of a foundation material for forming a foundation layer for supporting a bottom most build layer of the composite model;
  (2) depositing a build layer of the first material onto a preceding layer;
  (3) removing a selected area of only the first material from the deposited build layer;
  (4) filling he selected area of the removed first material with the second material;
  (5) reducing a thickness of the build layer to a desired final thickness to complete formation of the build layer for supporting a next subsequent build layer; and
  (6) repeatedly repeating steps (2) through (5) for each subsequent build layer until fabrication of the composite model is completed;
  (7) depositing at least one layer of the shell material to form a termination layer of the composite model; and
  (8) using a model mater as the first material and using a sacrificial material as the shell material.

* * * * *